(12) United States Patent
Kume et al.

(10) Patent No.: US 12,472,969 B2
(45) Date of Patent: Nov. 18, 2025

(54) VEHICLE NOTIFICATION FOR DECREASE IN THE RESIDUAL FUEL/ENERGY

(71) Applicant: DENSO CORPORATION, Kariya (JP)

(72) Inventors: Takuya Kume, Kariya (JP); Kazuki Izumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 29 days.

(21) Appl. No.: 18/363,581

(22) Filed: Aug. 1, 2023

(65) Prior Publication Data

US 2024/0017736 A1 Jan. 18, 2024

Related U.S. Application Data

(63) Continuation of application No. PCT/JP2022/009794, filed on Mar. 7, 2022.

(30) Foreign Application Priority Data

Mar. 15, 2021 (JP) .................... 2021-041705

(51) Int. Cl.
*B60W 50/14* (2020.01)
*B60K 35/00* (2024.01)
(Continued)

(52) U.S. Cl.
CPC .......... *B60W 50/14* (2013.01); *B60K 35/00* (2013.01); *B60W 60/005* (2020.02); *B60K 35/10* (2024.01);
(Continued)

(58) Field of Classification Search
CPC ........ B60K 2360/119; B60K 2360/168; B60K 2360/169; B60K 2360/175; B60K 2360/178; B60K 35/00; B60K 35/10; B60K 35/20; B60K 35/22; B60K 35/23; B60K 35/26; B60W 20/00; B60W 2050/143;
(Continued)

(56) References Cited

U.S. PATENT DOCUMENTS

2015/0302749 A1* 10/2015 Kitagawa ............. B60W 10/00
340/995.24
2016/0334623 A1 11/2016 Kishi
(Continued)

FOREIGN PATENT DOCUMENTS

JP 2015140061 A 8/2015
JP 5824817 B2 12/2015
(Continued)

*Primary Examiner* — Omer S Khan
(74) *Attorney, Agent, or Firm* — Harness, Dickey & Pierce, P.L.C.

(57) ABSTRACT

A vehicle control device is for a vehicle. The vehicle has a user-involvement mode and an automated driving mode as driving modes. The user-involvement mode is a driving mode in which a user sitting in a driver's seat is required to monitor a front of the vehicle. The automated driving mode being a driving mode in which the user is not required to monitor the front of the vehicle. A processor acquires information of a current driving mode, and acquires a residual amount of energy for driving. The processor may perform a notification related to a decrease in the residual amount of energy based on a fact that the residual amount of energy becomes equal to or less than a predetermined threshold.

17 Claims, 7 Drawing Sheets

(51) Int. Cl.
   *B60K 35/10* (2024.01)
   *B60W 60/00* (2020.01)
(52) U.S. Cl.
   CPC .. *B60K 2360/119* (2024.01); *B60W 2050/143* (2013.01); *B60W 2050/146* (2013.01); *B60W 2510/244* (2013.01); *B60W 2530/209* (2020.02); *B60W 2554/406* (2020.02)
(58) Field of Classification Search
   CPC ..... B60W 2050/146; B60W 2510/244; B60W 2530/209; B60W 2554/406; B60W 50/14; B60W 60/005; B60W 60/0053; G08G 1/16
   See application file for complete search history.

(56) References Cited

U.S. PATENT DOCUMENTS

| | | | |
|---|---|---|---|
| 2018/0046185 A1 | 2/2018 | Sato et al. | |
| 2019/0138003 A1* | 5/2019 | Ming | G05D 1/0061 |
| 2019/0294173 A1* | 9/2019 | Szubbocsev | G05D 1/0274 |
| 2019/0375427 A1* | 12/2019 | Whitt | G08G 1/165 |

FOREIGN PATENT DOCUMENTS

| | | | |
|---|---|---|---|
| JP | 2018027726 A | 2/2018 | |
| JP | 2019142246 A | 8/2019 | |

* cited by examiner

VEHICLE NOTIFICATION FOR DECREASE IN THE RESIDUAL FUEL/ENERGY

CROSS-REFERENCE TO RELATED APPLICATIONS

The present application is a continuation application of International Patent Application No. PCT/JP2022/009794 filed on Mar. 7, 2022, which designated the U.S. and claims the benefit of priority from Japanese Patent Application No. 2021-041705, filed on Mar. 15, 2021. The entire disclosures of all of the above applications are incorporated herein by reference.

TECHNICAL FIELD

The present disclosure relates to a vehicle control device executing a control responding to decrease of fuel or battery level for driving in a vehicle having an automated driving function.

BACKGROUND

A vehicle control device starts an automated driving of a vehicle when the vehicle is caught in a traffic jam having a length longer than a predetermined value.

SUMMARY

According to at least one embodiment of the present disclosure, a vehicle control device is for a vehicle having a user-involvement mode and an automated driving mode as driving modes. The user-involvement mode is a driving mode in which a user sitting in a driver's seat is required to monitor a front of the vehicle. The automated driving mode is a driving mode in which the user is not required to monitor the front of the vehicle. The vehicle control device includes a processor configured to acquire information of a current driving mode, and acquire a residual amount of energy that is a residual amount of power stored in a battery for driving or a residual amount of fuel for driving.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTIONS

Figure 1:
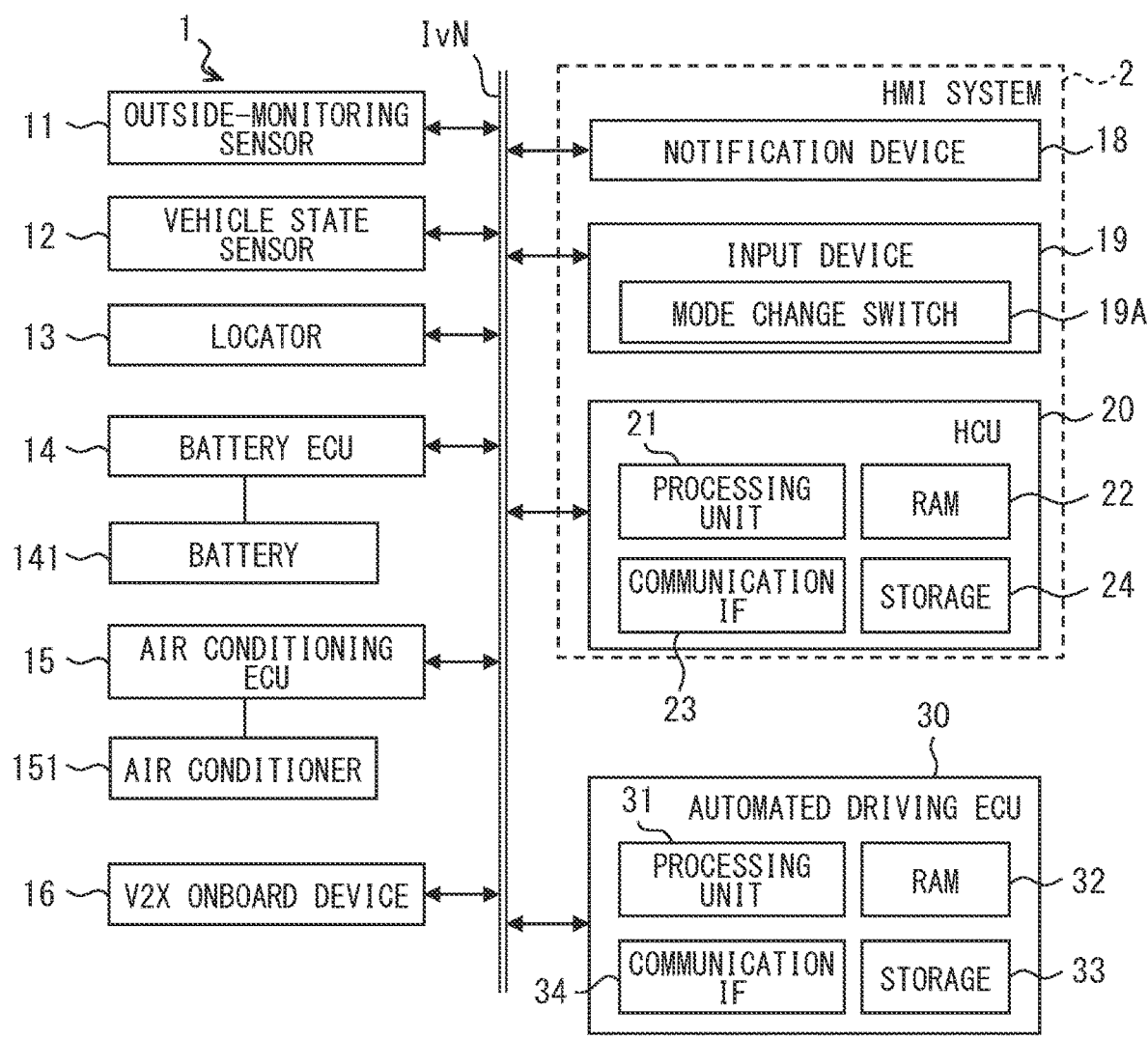
FIG. 1 is a block diagram showing an overall configuration of an automated driving system.

To begin with, examples of relevant techniques will be described. According to a comparative example, a vehicle control device displays an icon image warning of low gasoline level on a head-up display when a residual amount of gasoline becomes equal to or less than a predetermined threshold.

There can be multiple automation levels of driving operations, as defined by the Society of Automotive Engineers of America (SAE International), for example. It is assumed that the vehicle control device having an automated driving function provides two driving modes: a user-involvement mode and an automated driving mode. The user-involvement mode is a mode in which the user performs at least part of driving tasks. The automated driving mode is a mode in which a system performs all driving tasks. The automated driving mode corresponds to a mode in which the user does not need to monitor surroundings (mainly front) of the vehicle. The user-involvement mode corresponds to a level in which the user is obliged to monitor the surroundings of the vehicle. The system here is an in-vehicle system including the vehicle control device. The user here is an occupant sitting in the driver's seat. The user-involvement mode corresponds to a driving mode at a level in which the user is required to monitor the vehicle surroundings. The user-involvement mode may include a fully manual mode and a driving assistance mode. The fully manual mode is a mode in which all driving tasks are performed by the user. The driving assistance mode is a mode in which some driving tasks are performed by the system.

During the automated driving mode, the user is not required to look ahead of the vehicle and the user may be allowed to perform a predetermined action as a second task, such as operating a smartphone. Therefore, the user can easily take his/her eyes off the instrument panel or the like during the automated driving mode. In other words, the user is more likely to be unaware of the vehicle status during the automated driving mode than during the user-involvement mode. For example, the user is more likely to lose track of a residual amount of energy for the vehicle to continue running, such as gasoline or electric power stored in a battery.

As a result, in the automated driving mode, when the user pays attention to the residual amount of energy, it may already be dropped to a level where refueling or charging is required. In such a case, the user is required to change an initial plan suddenly and to refuel or charge, so the user's convenience could be reduced.

The comparative example notifies the user that the residual amount of energy is below a certain value by displaying a warning image on an in-vehicle display or by turning on an indicator. However, during the automated driving mode, the user is less likely to look at an in-vehicle display due to, for example, operating a smartphone. Therefore, in the comparative example, there remains a concern that the user may be late in noticing an indication related to the notification of the decrease in the residual amount of energy.

In contrast to the comparative example, according to the present disclosure, a possibility that decrease in residual amount of energy for driving impairs user convenience can be reduced.

According to an aspect of the present disclosure, a vehicle control device is for a vehicle having a user-involvement mode and an automated driving mode as driving modes. The user-involvement mode is a driving mode in which a user sitting in a driver's seat is required to monitor a front of the vehicle. The automated driving mode is a driving mode in which the user is not required to monitor the front of the vehicle. The vehicle control device includes a driving mode acquisition unit, a residual amount acquisition unit, and a notification processing unit. The driving mode acquisition unit is configured to acquire information of a current driving mode. The residual amount acquisition unit is configured to acquire a residual amount of energy that is a residual amount of power stored in a battery for driving or a residual amount of fuel for driving. The notification processing unit is configured to perform a notification related to a decrease in the residual amount of energy based on a fact that the residual amount of energy becomes equal to or less than a predetermined threshold. The notification processing unit is configured to perform the notification earlier when the current driving mode is the automated driving mode than when the current driving mode is the user-involvement mode.

According to the vehicle control device described above, in the automated driving mode, the information related to the decrease in the residual amount of energy is presented earlier than in the user-involvement mode. Therefore, the user can easily notice a current state of the residual amount of energy. As the result, a possibility of that the residual amount of energy has already dropped to a level that requires refueling or recharging when the user pays attention to the residual amount of the energy can be reduced. That is, a possibility that the user's convenience is impaired due to a decrease in the residual amount of energy can be reduced.

According to an aspect of the present disclosure, a vehicle control device is for a vehicle having a user-involvement mode and an automated driving mode as driving modes. The user-involvement mode is a driving mode in which a user sitting in a driver's seat is required to monitor a front of the vehicle. The automated driving mode is a driving mode in which the user is not required to monitor the front of the vehicle. The vehicle control device includes a driving mode acquisition unit, a residual amount acquisition unit, and a vehicle control unit. The driving mode acquisition unit is configured to acquire information of a current driving mode. The residual amount acquisition unit is configured to acquire a residual amount of energy that is a residual amount of power stored in a battery for driving or a residual amount of fuel for driving. The vehicle control unit is configured to execute predetermined vehicle control for power saving based on the residual amount of energy being equal to or less than a predetermined threshold. The vehicle control unit is configured to execute the vehicle control for power saving earlier when the current driving mode is the automated driving mode than when the current driving mode is the user-involvement mode.

According to the vehicle control device described above, in the automated driving mode, the vehicle control responding to the decrease in the residual amount of energy is executed earlier than in the user-involvement mode. By executing the vehicle control for power saving from a relatively early timing, a duration of the automated driving mode can be extended. In other words, a risk of the automated driving mode being canceled or the vehicle becoming inoperable due to the decrease in the residual amount of energy can be reduced. According to this configuration, a possibility that the user's convenience is impaired due to the decrease in the residual amount of energy can be reduced.

According to an aspect of the present disclosure, a vehicle control method is for a vehicle having a user-involvement mode and an automated driving mode as driving modes. The user-involvement mode is a driving mode in which a user sitting in a driver's seat is required to monitor a front of the vehicle. The automated driving mode is a driving mode in which the user is not required to monitor the front of the vehicle. The vehicle control method is executed by at least one processor. The vehicle control method includes acquiring information of a current driving mode. The vehicle control method includes acquiring a residual amount of energy that is a residual amount of power stored in a battery for driving or a residual amount of fuel for driving. The vehicle control method includes performing a notification related to a decrease in the residual amount of energy based on a fact that the residual amount of energy becomes equal to or less than a predetermined threshold. The vehicle control method includes performing the notification earlier when the current driving mode is the automated driving mode than when the current driving mode is the user-involvement mode.

Hereinafter, an embodiment of the present disclosure will be described with reference to the drawings. The present disclosure can be appropriately modified and implemented to conform to the laws, regulations, and conventions of an area where the vehicle control device is used.

FIG. 1 is a diagram showing an example of a schematic configuration of an automated driving system 1 according to the present disclosure. The automated driving system 1 may be mounted on a vehicle that can travel on roads. The vehicle on which the automated driving system 1 is mounted may be a four-wheel automobile, a two-wheel automobile, a three-wheel automobile, or the like. Motorized bicycles may also be included in the two-wheel automobile. The vehicle on which the automated driving system 1 is mounted may be an owner car, a shared car, a rental car, or a transportation service car. The owner car is a car owned by an individual. The transportation service car includes a taxi, a route bus, a community bus, and the like. The shared car is a vehicle provided for a car sharing service. A rental car is a vehicle provided for a vehicle rental service. Hereafter, the vehicle on which the automated driving system 1 is mounted is also described as a subject vehicle.

Here, as an example, the subject vehicle is an electric vehicle, but the subject vehicle is not limited to the electric vehicle. The subject vehicle may be an engine vehicle, or a hybrid vehicle. The electric vehicle is a vehicle that has only a motor as a drive source. The hybrid vehicle is a vehicle that has a motor and an engine as the drive source.

A user in the present disclosure is a person who is required to receive driving operation authority from the automated driving system 1 when an automated driving mode ends. The term "user" means a person who is sitting in a driver seat, in other words, a driver's seat occupant. The term "user" in the present disclosure may be replaced with a "driver". The subject vehicle may be a remotely operated vehicle which is remotely operated by an operator outside the subject vehicle. The operator here is a person who has an authority to remotely control the subject vehicle from the outside of the subject vehicle, such as a predetermined center. The operator can also be included in the user. An HCU 20, described below, may be configured to present various information to the operator.

In the following explanation, a front-rear direction, a left-right direction, and an up-down direction are defined with reference to the subject vehicle. Specifically, the front-rear direction corresponds to a longitudinal direction of the subject vehicle. The left-right direction corresponds to a width direction of the subject vehicle. The up-down direction corresponds to a height direction of the subject vehicle. From another point of view, the up-down direction corresponds to a direction perpendicular to a plane parallel to the front-rear direction and the left-right direction.

The automated driving system 1 provides a so-called automated driving function for autonomously driving the subject vehicle. There can be multiple levels of automation of driving operations (hereinafter referred to as automation levels), as defined by the Society of Automotive Engineers of America (SAE International), for example. According to the SAE definition, for example, the automation levels are categorized into the following six levels.

Level 0 is a level in which the user in driver's seat performs all driving tasks without an involvement of the system. The driving tasks may include a steering operation, acceleration/deceleration operation, and the like. The driving tasks may also include monitoring surroundings of the subject vehicle, such as a front area of the subject vehicle. Level 0 corresponds to a fully manual driving level. Level 1 is a level in which the system assists either the steering operation or the acceleration/deceleration operation. Level 2 is a level in which the system supports multiple operations among the steering operation and the acceleration/deceleration operation. The level 1 and the level 2 correspond to a driving assistance level, respectively.

Level 3 is a level in which the system performs all the driving tasks within an operational design domain (ODD), while the operation authority is transferred from the system to the user in an emergency. The ODD defines conditions under which the automated driving can be executed, such as a situation the subject vehicle is traveling on a highway. In the level 3, the user is required to respond quickly when the system requests to take over the driving operation. In addition, instead of the user, the operator existing outside of the subject vehicle may take over the driving operation from the system. The level 3 corresponds to a conditional automated driving.

Level 4 is a level in which the system performs all driving tasks, except under a specific circumstance, such as an unsupported road, an extreme environment, and the like. The Level 4 corresponds to a level in which the system performs all the driving tasks within the ODD. The level 4 corresponds to a highly automated driving. Level 5 is a level in which the system is capable of performing all driving tasks in any situation. The level 5 corresponds to a fully automated driving. The level 3 to the level 5 correspond to the automated driving. The level 3 to the level 5 can also be referred to as an automated driving level that the system automatically executes all controls related to driving of the subject vehicle. A level of the automated driving in the present disclosure may be level 3 or level 4 or higher. Hereinafter, a case in which the automated driving system 1 is configured to be capable of performing automated driving at the level 3 or higher level will be described.

<Configurations of Automated Driving System>

The automated driving system 1 has various configurations shown in FIG. 1 as an example. That is, the automated driving system 1 has an outside-monitoring sensor 11, a vehicle state sensor 12, a locator 13, a battery ECU 14, a battery 141, an air conditioning ECU 15, an air conditioner 151, and a V2X onboard device 16. The automated driving system 1 also includes a notification device 18, an input device 19, the HCU 20 and an automated driving ECU 30. A system including the notification device 18, the input device 19, and the HCU 20 is configured as an HMI system 2. The HMI system 2 provides an input interface function for receiving a user operation and an output interface function for presenting information to the user. The term "ECU" used in the above-described component name is an abbreviation for electronic control unit. The HMI is an abbreviation for human machine interface. The HCU is an abbreviation for HMI control unit. The V2X is an abbreviation for vehicle to x (everything/something) and indicates a communication technology that connects various things to a vehicle.

Each device, such as the outside-monitoring sensor 11, is connected to the HCU 20 so as to communicate with each other via an in-vehicle network IvN. The in-vehicle network IvN is a communication network built in the subject vehicle. The battery ECU 14 is directly connected to the battery 141, and the air conditioning ECU 15 is directly connected to the air conditioner 151 by a predetermined cable or signal line. A method of connecting devices in this disclosure is an example and can be changed as appropriate. A topology of the in-vehicle network IvN is not limited to a bus type, but may be a mesh type, a star type, or a ring type. A standard of the in-vehicle network IvN may be a variety of standards, such as Controller Area Network (hereinafter, CAN: registered trademark), Ethernet (registered trademark), or FlexRay (registered trademark).

An outside-monitoring sensor 11 is a sensor that monitors surroundings of the subject vehicle. The outside-monitoring sensor 11 is configured to detect presence and position of a predetermined detection target. The outside-monitoring sensor 11 may be, for example, an outside-monitoring camera, a millimeter wave radar, a LiDAR (Light Detection and Ranging/Laser Imaging Detection and Ranging), or a sonar. The automated driving system 1 may have multiple types of outside-monitoring sensors 11, such as the LiDAR and the outside-monitoring camera, for each detection direction. The outside-monitoring camera is a vehicle-mounted camera arranged to capture an image in a predetermined direction outside the subject vehicle. The outside-monitoring camera includes a front camera, which is a camera positioned at a location where the camera can capture images of the front of the subject vehicle, such as an upper end of a windshield inside the vehicle compartment, or a front grill. The front camera detects the various detection target using a classifier realized with use of, for example, a Convolutional Neural Network (CNN) or a Deep Neural Network (DNN).

The detection target may include, for example, a moving object, such as pedestrians or other vehicles. The other vehicles include a bicycle, a motorized bicycle, and a motorcycle. In addition, the outside-monitoring sensor 11 is configured to be capable of detecting predetermined features. The features to be detected by the outside-monitoring sensor 11 include a road edge, a median strip, a road marking, and a three-dimensional structure arranged along the roadside. The road marking is a marking that is painted on a road surface for traffic control and traffic regulation purpose. For example, the road marking includes a lane division line indicating a lane boundary, a pedestrian crossing, a stop line, a buffer zone, a safety zone, or a regulatory arrow. The three-dimensional structure arranged along the roadside is a guard rail, a traffic sign, or a traffic light. The outside-monitoring sensor 11 may be configured to be capable of detecting features that can be used as landmarks in a localization process described below.

Object recognition processing based on observation data generated by the outside-monitoring sensor 11 may be executed by an ECU outside the sensor, such as the automated driving ECU 30. A part or all of the object recognition function provided by the outside-monitoring sensor 11, such as the front camera and the millimeter wave radar, may be provided by the automated driving ECU 30. In that case, the outside-monitoring sensor 11 may output observation data such as image data and ranging data to the automated driving ECU 30 as detection result data. The observation data here indicates, for example, image data generated by a camera, three-dimensional point group data generated by LiDAR, or reception result data of detection wave obtained by millimeter wave radar/sonar.

The vehicle state sensor 12 is a sensor group that detects information related to a state of the subject vehicle. The vehicle state sensor 12 includes a vehicle speed sensor, a steering angle sensor, an acceleration sensor, and a yaw rate sensor. The vehicle speed sensor detects a traveling speed of the subject vehicle. The steering angle sensor detects a steering angle of the subject vehicle. The acceleration sensor detects acceleration such as longitudinal acceleration and lateral acceleration of the subject vehicle. The yaw rate sensor detects an angular velocity of the subject vehicle. The vehicle state sensor 12 outputs a detection result to the in-vehicle network IvN. The detection result is data indicating a current value of physical quantity to be detected.

A combination of sensors used by the automated driving system 1 as the vehicle state sensor 12 may be appropriately designed, and it is not necessary to include various type of sensors as described above. Further, when the subject vehicle is an engine vehicle or a hybrid vehicle, the vehicle state sensor 12 also includes a remaining fuel sensor. The remaining fuel sensor is a sensor that detects a residual amount of fuel, which is the amount of liquid fuel remaining in the fuel tank. The remaining fuel sensor may be a sensor detecting a height of a liquid level in the fuel tank. Furthermore, the automated driving system 1 may include, as the vehicle state sensor 12, a steering torque sensor that detects steering torque. The steering torque sensor detects the steering torque based on a torsion angle of the torsion bar provided on the steering shaft, for example. The automated driving system 1 may include a steering wheel sensor. The steering wheel sensor is installed on the steering wheel and detects whether the user is gripping the steering wheel. The steering wheel sensor may be a capacitive sensor that detects whether the user is gripping the steering wheel based on a change in capacitance.

The locator 13 is a device that generates highly accurate position information of the subject vehicle by complex positioning that combines multiple pieces of information. The vehicle position is represented by three-dimensional coordinates of latitude, longitude, and altitude, for example. The locator 13 is realized with use of a GNSS receiver, for example. The GNSS receiver is a device that sequentially detects a current position of the GNSS receiver by receiving navigation signals (i.e., positioning signals) transmitted from positioning satellites included in a global navigation satellite system (GNSS). For example, when the GNSS receiver can receive the positioning signals from four or more positioning satellites, the GNSS receiver outputs positioning results every 100 milliseconds. The GNSS may be the GPS, the GLONASS, the Galileo, the IRNSS, the QZSS, or the Beidou.

The locator 13 may calculate sequentially the position of the subject vehicle by combining a positioning result of the GNSS receiver and an output of an inertial sensor. For example, in environments where the GNSS receiver cannot receive positioning signals, such as in a tunnel, the locator 13 performs dead reckoning (i.e., autonomous navigation) by using a yaw rate and a vehicle speed. A vehicle position information generated by the locator 13 is output to the in-vehicle network IvN and is used by the automated driving ECU 30.

The locator 13 may be configured to be capable of performing the localization process. The localization process is a process of specifying a detailed position of the subject vehicle by collating a coordinate of the landmark specified with an image captured by the outside-monitoring sensor, such as the front camera 18a, and a coordinate of the landmark registered in the map data. The landmark is, for example, a guide sign such as a direction sign, the traffic light, a pole, or the stop line. The localization process may be performed by collating the three-dimensional point group data generated by the LiDAR and the three-dimensional map data. The map data including information about various features may be stored in a non-volatile storage device (not shown) or may be downloaded from an external server as needed and stored in a predetermined volatile memory. A part or all the functions of the locator 13 may be provided in the automated driving ECU 30 or the HCU 20. A functional arrangement of the automated driving system 1 can be appropriately changed.

The battery ECU 14 monitors a state of charge of the battery 141. For example, the battery ECU 14 estimates a residual power that is an amount of residual power in the battery 141 based on an output voltage value of the battery 141. The residual power can also be called SOC (State of Charge). The battery ECU 14 may calculate the residual power based on an integrated value of charging and discharging currents. Various methods can be employed as a method for estimating the residual power. The battery ECU 14 outputs a residual amount signal to the HCU 20 and the automated driving ECU 30, and the residual amount signal indicates the residual power. The residual amount signal may be output periodically or may be output upon a request from the HCU 20. The residual power may be expressed as a voltage level, or as a percentage (%) with a fully charged state being 100%. More specifically, the residual power can be expressed as the percentage that indicates a ratio of a subtracted value to the rated capacity of the battery 141. The subtracted value is the rated capacity minus an integral value of charged/discharged power.

The air conditioning ECU 15 is an electronic control unit for controlling the air conditioner 151. The air conditioning ECU 15 controls the air conditioner 151 such that a room temperature measured by a room temperature sensor matches a target temperature. The target temperature, for example, may be set by the user via the HMI, or may be automatically set using a predetermined table that indicates the target temperature corresponding to an outside temperature. The outside temperature may be obtained by an outside temperature sensor. Moreover, the air conditioning ECU 15 controls the air conditioner 151 according to instructions from the automated driving ECU 30 or the HCU 20.

The air conditioner 151 is a device that blows conditioned air from an outlet provided in the subject vehicle. The conditioned air is air whose temperature is adjusted according to the target temperature. The air conditioner 151 is configured to perform cooling and heating by, for example, a heat pump cycle capable of performing heating and cooling with one refrigerant circuit. The air conditioner 151 includes a compressor and an electric fan for cooling and heating.

The V2X onboard device 16 is a device for the subject vehicle to perform wireless communication with another device. The V2X onboard device includes a communication module for executing wireless communication compliant with a predetermined wide area wireless communication standard. The wide area wireless communication standard here, may be any standard, such as long term evolution (LTE), 4G, or 5G. The subject vehicle functions as a connected car that can be connected to the Internet by mounting the V2X onboard device 15. For example, the automated driving ECU 30 cooperates with the V2X onboard device 16 to acquire traffic information and weather information from the other device, such as an external server, a roadside device, and the like. The traffic information includes information about a start point and an end point of a congested road section. The V2X onboard device 16 may be configured to be capable of performing vehicle-to-vehicle communication, which is wireless communication with other vehicles, and road-to-vehicle communication, which is wireless communication with a roadside device. The roadside unit is a communication facility installed along a road.

Figure 2:
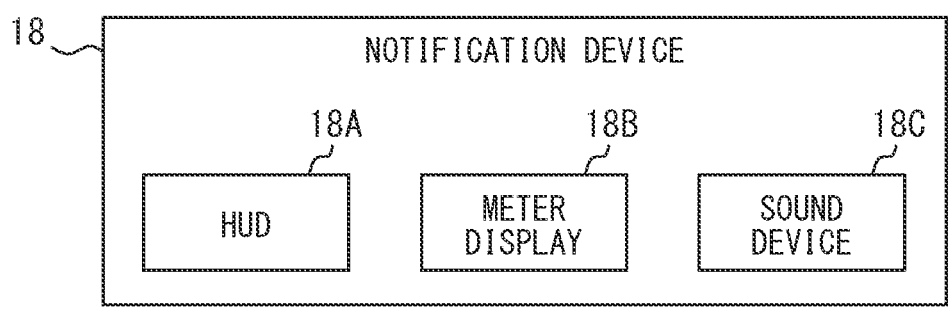
FIG. 2 is a block diagram illustrating an example of a notification device.

The notification device 18 is a group of devices used to notify the user of an operating status of the automated driving system 1. The notification device 18 includes a HUD 18A, a meter display 18B, and a sound device 18C, as shown in FIG. 2, for example. HUD is an abbreviation for Head-Up Display.

The HUD 18A is a device that projects image light onto a predetermined area of a windshield and displays a virtual image that can be perceived by the user. The HUD 18A projects the image light based on control signals and video data that are input from the HCU 20. The HUD 18A includes a projector, a screen, and a magnifying optical system. The windshield (front glass) can function as a screen. The magnifying optical system may include, for example, a concave mirror and a lens. The HUD 18A is accommodated in a compartment in an instrument panel, for example.

The meter display 18B is a display placed in front of the driver seat in the instrument panel. The meter display 18B is capable of displaying full color. The meter display 18B may be provided by a liquid crystal display, an organic light emitting diode (OLED) display, a plasma display, or the like. The HUD 18A or the meter display 18B corresponds to a display device.

The sound device 18C is a device that outputs sound from at least one speaker based on a control signal input from the HCU 20. The expression "sound" in the present disclosure also includes voice and music. The sound device 18C may have multiple speakers. The sound device 18C may be a stereophonic device that localizes a sound image of a virtual sound source in any position in a three-dimensional space by outputting sound from three or more speakers.

The automated driving system 1 does not need to include all the devices described above as the notification device 18. The automated driving system 1 may have a device that stimulates the user's sense of touch, such as a vibrator embedded in a backrest of the driver seat, as a means of presenting information to the user. The notification device 18 may include a center display placed in a center section of the instrument panel in the width direction of the subject vehicle. The meter display 18B can be replaced with the center display. For convenience, in the present disclosure, a device that displays a real image is described as a real image display or an instrument panel display in order to distinguish it from the HUD 18A. The real image display is a display mounted on the instrument panel such as the meter display 18B or the center display.

The input device 19 is a device for receiving the user's operation to the automated driving system 1. The input device 19 may be a steering switch provided on a spoke portion of a steering wheel, a lever provided on a steering column portion, a touch screen laminated on the center display, or the like. The automated driving system 1 may include multiple types of devices described above as the input device 19. The user's operation can be read as a user's action or instruction input. The input device 19 outputs a user operation signal to the HCU 20, and the user operation signal is an electric signal corresponding to the operation performed by the user to the input device 19. The operation signal includes information that indicates details of the user's operation.

The HMI system 2 of this embodiment includes a mode change switch 19A as the input device 19, for example. The mode change switch 19A is a switch for the user to change the driving mode. The mode change switch 19A includes an AD (Automated Driving) permission switch and an AD terminating switch. The AD permission switch is a switch to request or permit starting the automated driving mode. The AD terminating switch is a switch to cancel (i.e., terminate) the automated driving mode. The AD permission switch and the AD terminating switch may be provided separately or may be the same switch. Here, as an example, the AD permission switch and the AD terminating switch are provided by the same switch. That is, the same switch functions as the AD permission switch in a mode other than the automated driving mode, and functions as the AD terminating switch in the automated driving mode.

The mode change switch 19A may include an assist start switch in addition to the AD permission switch. The assistance start switch is a switch to start a driving assistance mode. The assistance start switch and the AD permission switch may be the same switch. The assistance start switch or the AD permission switch corresponds to a level up switch for raising the automation level. The mode change switch 19A may include an assist terminating switch in addition to the AD terminating switch. The assistance terminating switch and the AD terminating switch may be the same button. The assistance terminating switch or the AD terminating switch corresponds to a level down switch for lowering the automation level.

The mode change switch 19A corresponds to a switch for activating or stopping an automated driving function or a driving assistance function provided by the automated driving ECU 30. The mode change switch 19A is arranged on the spoke portion as the steering switch, for example. An up button or forward button provided on the steering wheel may also be used as the mode change switch 19A. The up button or forward button corresponds to a button for increasing a volume of the sound device 18C or the target temperature of the air conditioner. In the automated driving system 1, a down button or return button provided on the steering wheel may be configured to function as a cancel switch. The cancel switch is a button to cancel switching of the driving mode. The lever provided on the steering column portion may be configured to function as the mode change switch 19A.

The mode change switch 19A may be provided by a combination of the touch screen and an image displayed on the instrument panel display. That is, the mode change switch 19A may be a button image (switch image). The HMI system 2 can detect the user's selection of the button image using the touch screen. The button image may be an icon image. When the mode change switch 19A is provided by a touch screen system, the mode change switch 19A as the AD terminating switch always remains displayed in a predetermined position of the instrument panel display during the automated driving mode.

The automated driving system 1 may be configured to receive user's commands for switching the driving modes via voice input. The input device 19 may include a voice input device that has a microphone and a processor that performs voice recognition process on the voice signals collected by the microphone. The voice recognition process itself may be performed by an external server.

Operation members such as a brake pedal, an accelerator pedal, a steering wheel, and a shift lever are also devices for the user to input instructions to the subject vehicle including the automated driving system 1. Therefore, the input device 19 can also include the brake pedal, the accelerator pedal, the steering wheel, the shift lever, and the like. When the brake pedal and the accelerator pedal are not distinguished, they are also described as pedals. For example, the HCU 20 receives a signal (for example, a voltage value) indicating a depression amount of the brake pedal from a brake pedal sensor. The depression amount of the pedals may be referred to as a stroke amount. Further, the HCU 20 receives a signal indicating the depression amount of the accelerator pedal from the accelerator pedal sensor. A signal indicating the depression amount/depression force of pedals, and a signal indicating a steering angle, or a steering torque may also be included in the operation signal.

The HCU 20 integrally controls information presentation to the user. The HCU 20 controls a display screen of the meter display 18B based on the control signal input from the automated driving ECU 30 and/or the operation signal input from the input device 19. For example, the HCU 20 displays an image representing the operation state of the automated driving function and/or an image of the residual power in the battery 141 on the HUD 18A and the meter display 18B based on the information provided by the automated driving ECU 30. The HCU 20 causes the sound device 18C to output a notification sound or a predetermined voice message.

The HCU 20 includes a computer, and this computer may include a processing unit 21, a RAM 22, a storage 23, a communication interface 24, and a bus connecting these components. The processing unit 21 is provided by hardware circuit and executes a calculation process in cooperation with the RAM 22. The processing unit 21 includes at least one calculation core, i.e., processor, such as a central processing unit (CPU). The processing unit 21 executes, by accessing the RAM 22, various processes for functioning as the functional blocks described later. The storage 23 includes a non-volatile storage medium, such as a flash memory. The storage 23 stores a vehicle control program, which is a program to be executed by the processing unit 21. Executing the vehicle control program by the processing unit 21 corresponds to, as a vehicle control method, executing a method corresponding to the vehicle control program. The communication interface 24 is a circuit for communicating with other devices via the in-vehicle network IvN. The communication interface 24 may be provided by an analog circuit element, an IC, or the like. The HCU 20 will be described in detail later.

The automated driving ECU 30 is an ECU that executes a part or all of the driving operations instead of the user by controlling a traveling actuator based on the detection results of the outside-monitoring sensor 11. The automated driving ECU 30 is also called an automatic operation device. The traveling actuator includes, for example, a brake actuator as a braking device, an electronic throttle, and a steering actuator. The steering actuator includes an EPS (Electric Power Steering) motor. Another ECU may intervene between the automated driving ECU 30 and the driving actuator. The other ECU is, for example, a steering ECU for steering control, a power unit control ECU for acceleration/deceleration control, or a brake ECU.

The automated driving ECU 30 has multiple driving modes with different automation levels. Here, as an example, the automated driving ECU 30 has a fully manual mode, a first assistance mode, a second assistance mode, a third assistance mode, and an automated driving mode and is configured to be switched between these driving modes. Each driving mode differs in the range of driving tasks that the user is responsible for, in other words, differs in the range of driving tasks in which the system intervenes. The system here indicates the automated driving system 1. The system may be substantially understood as the automated driving ECU 30.

The fully manual mode is a driving mode in which the user performs all driving tasks. The fully manual mode corresponds to the automation level 0. Therefore, the fully manual mode can also be referred to as a level 0 mode.

The first assistance mode is a driving mode in which the system executes or assists speed control, and the user executes the other driving tasks. As one aspect, the first assistance mode can be interpreted as a state in which an ACC (Adaptive Cruise Control) function is activated. The ACC function may be a function that causes the subject vehicle to travel regularly at a target speed. The ACC function may also be a function that causes the subject vehicle to follow a preceding vehicle while keeping the inter-vehicle distance with the preceding vehicle constant. A target value of the traveling speed in the ACC is set by the user within a preset speed range. A target value of the inter-vehicle distance with a preceding vehicle in the ACC is set by the user within a preset range. The first assistance mode corresponds to the automation level 1. Therefore, the first assistance mode can also be referred to as a level 1 mode.

The second assistance mode is a driving mode in which the system executes or assists speed control and supports the steering operation. The user is responsible for the steering operation in the second assistance mode. The first and the second assistance mode correspond to driving modes in which hands-on and eyes-on are required. The hands-on means that the user holds the steering wheel. The hands-off means that the user does not hold the steering wheel. The eyes-on means that the user monitors the surrounding traffic conditions such as the front of the subject vehicle. The eyes-off means that the user does not monitor the surrounding traffic condition, that is, looking away from the front of the subject vehicle. The second assistance mode corresponds to a driving mode in which the ACC function and an LTA (Lane Tracing Assist) function are operating, for example. The LTA function is a function that controls steering to maintain the subject vehicle in a lane based on lane information. The second assistance mode corresponds to the automation level 2.0. The second assistance mode can also be referred to as a hands-on level 2 mode.

The third assistance mode is a driving mode in which the system performs speed control and steering control. The third assistance mode corresponds to a driving mode that the user's eyes-on is required but the hands-off is allowable. The third assistance mode corresponds to a driving mode in which the ACC function and a LTC (Lane Trace Control) function are operating, for example. The LTC function is a function that controls the steering such that the subject vehicle travels within an ego-lane. The LTC function includes a function of generating a scheduled traveling line along the ego-lane. The ego-lane means a lane in which the subject vehicle is traveling among the lanes provided in a traveling road. The traveling road is a road on which the subject vehicle is traveling. The difference between the LTC and LTA is whether the user is a substantial performer of the steering. That is, in the LTA, an entity performing the steering is the user, whereas in the LTC, the entity of steering is the system. LTC can also differ from LTA in that a lane changing is automatically executed as needed. However, in a broad sense, the LTC may also be included in the LTA. The third assistance mode corresponds to the so-called automation Level 2.1 to 2.9. A concept of the automation Level 2 may include a concept expressed as level 2.1 to 2.9. The third assistance mode can also be referred to as hands-off level 2 mode, advanced assistance mode, or semi-automated driving mode. When the second and third assistance modes are not distinguished in this disclosure, they are also described collectively as a level 2 mode or steering assistance mode.

In the modes from the fully manual mode to the third assistance mode, the user is responsible for at least a part of the driving tasks. In other words, these driving modes are driving modes in which the user is involved in at least a part of driving tasks. Therefore, in this disclosure, a driving mode corresponding to any of the modes from the fully manual mode to the third assistance mode is also called a user-involvement mode. The user-involvement mode can also be referred to as a manual driving mode as an antonym of the automated driving mode. The manual driving in this embodiment can also include a state in which driving assistance is being performed by the system. A driving mode corresponding to any of modes from the first assistance mode to the third assistance mode can be called a driving assistance mode.

The automated driving mode is a driving mode in which the system performs all driving tasks. Here, as an example, the automated driving mode is a driving mode corresponding to the automation level 3. The automated driving mode may be a driving mode that the system operates automated driving of the automation level 4 or 5. The automated driving mode corresponds to a driving mode in which the eyes-off is allowable, in other words, the user can perform a second task.

The second task is an activity other than driving tasks permitted to the user. The second task is a predetermined specific action. The second task can be called a secondary activity, other activity, or the like. The second task may include some or all of the following activities: watching videos, operating smartphones, reading e-books, and eating with one hand. In the automated driving mode equivalent to the level 3, the user is required to remain ready to respond promptly to a request from the automated driving system 1 to take over driving operations. Therefore, in the automated driving mode equivalent to the level 3, the user will be prohibited from performing certain activities such as sleeping, doing a task in which the user cannot release both hands immediately, and leaving the driver's seat. Acceptable actions as the second tasks and prohibited actions may be set based on the laws and regulations of the region where the subject vehicle is used.

In the automated driving mode, the automated driving ECU 30 automatically performs steering, acceleration, and deceleration (in other words, braking) of the subject vehicle such that the subject vehicle travels along the road to a destination set by the user. The switching of the driving mode is automatically executed due to a system limit, an exit from the ODD, in addition to the user operation.

The ODD includes, for example, (a) the traveling road is a highway or a motorway with a median strip, the guard rail and two or more lanes each way, and (b) the subject vehicle is in a traffic congestion. The traveling road means a road on which the subject vehicle is traveling. The traffic congestion may be, for example, defined as a situation in which the preceding and following vehicles are present and the traveling speed is less than 60 km/h. The ODD may include (c) a rainfall is equal to or less than a predetermined threshold, (d) the outside-monitoring sensor including the vehicle-mounted camera is operated normally. In addition, the ODD may include (e) no falling objects or parked vehicles exist on the road within a predetermined distance of the subject vehicle, and (f) no traffic lights or pedestrians within a detection range of the outside-monitoring sensor. A condition for determining whether automated driving is possible/impossible, in other words, a detailed condition for defining the ODD can be designed as appropriate.

Here, as an example, the system determines that automated driving is possible in each of the following cases: when traveling in the traffic congestion, and when traveling on a specific road segment. The automated driving in the traffic congestion can be called an automated driving in the congestion. The automated driving in the specific road section can be called an area-limited automated driving. As described above, depending on the settings of the ODD, there may be a model of the automated driving ECU 30 that allows automated driving only when the subject vehicle is traveling on a specific road section and in the traffic congestion.

The automated driving system 1 does not have to include all the above driving modes. For example, the combination of driving modes equipped in the automated driving system 1 may be only the fully manual mode, the first assistance mode, the second assistance mode, and the automated driving mode. Furthermore, the combination of driving modes equipped in the automated driving system 1 may be only the fully manual mode, the driving assistance mode, and the automated driving mode. The driving assistance mode may be a driving mode equivalent to the above second assistance mode.

The automated driving ECU 30 includes a computer as a main component and the computer includes a processing unit 31, a RAM 32, a storage 33, a communication interface 34, and a bus connecting these. The storage 33 stores an automated driving program, which is a program to be executed by the processing unit 31. Executing the automated driving program by the processing unit 31 corresponds to executing a method corresponding to the automated driving program. The automated driving program includes application software such as the above-described ACC, LTA, and LTC. A processor that executes processing related to driving assistance may be provided separately from a processor that executes processing related to automated driving.

Figure 3:
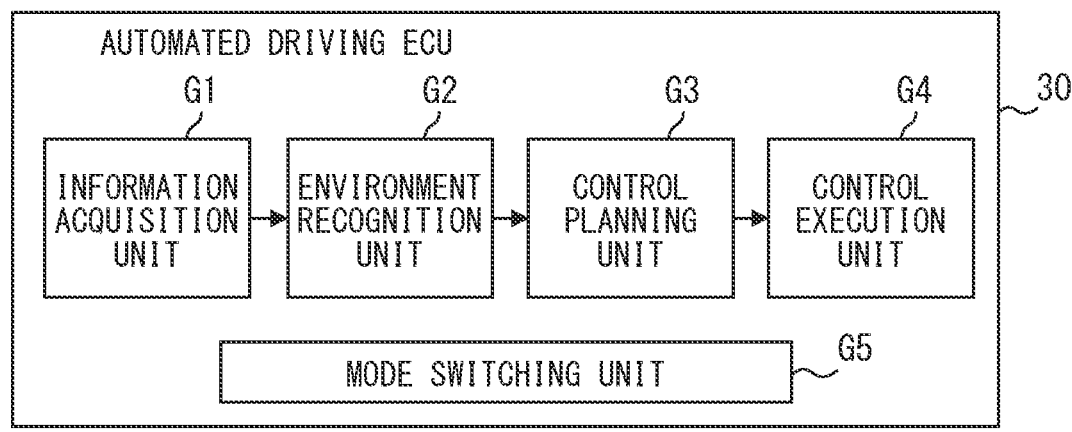
FIG. 3 is a functional block diagram of an automated driving ECU.

As shown in FIG. 3, the automated driving ECU 30 includes an information acquisition unit G1, an environment recognition unit G2, a control planning unit G3, a control execution unit G4, and a mode switching unit G5 as functional units realized by executing the automated driving program.

The information acquisition unit G1 is configured to acquire a variety of information for implementing driver assistance or automated driving. For example, the information acquisition unit G1 acquires the vehicle position information from the locator 13, and, based on the position information, acquires data of map around the subject vehicle from a map database not shown in the drawings. The map database may be installed in an external server. The information acquisition unit G1 acquires the detection result (i.e., sensing information) from the outside-monitoring sensor 11. The sensing information indicates a position, a moving speed, and type of each detected object. The detected object may be object existing around the subject vehicle, such as other moving object, feature, obstacle, and/or the like. Also, the information acquisition unit G1 can acquire traffic information from the V2X onboard device 16. The traffic information includes at least a part of position information of road construction, presence or absence of falling objects, position information of a congested road section, weather information, and traffic regulation information.

The environment recognition unit G2 recognizes a surrounding environment of the subject vehicle based on the vehicle position information, the sensing information, and the map data. For example, the environment recognition unit G2 grasps a position of the ego-lane, a shape of the ego-lane, and a relative position and relative speed of other vehicles around the subject vehicle. The locator 13 may identify the position of the ego-lane. The environment recognition unit G2 provides a recognition result of the surrounding environment to the HCU 20 as a surrounding environment information.

The control planning unit G3 is configured to plan details of a control to be executed as driving assistance or automated driving. In the automated driving mode, the control planning unit G3 generates the scheduled traveling line on which the subject vehicle travels, based on the recognition result of the surrounding environment generated by the environment recognition unit G2. The control execution unit G4 generates control commands based on the scheduled travel line determined by the control planning unit G3, and sequentially outputs the control commands to the travel actuators. The control execution unit G4 also controls turning-on/turning-off of light sources such as a direction indicator, a headlight, and a hazard flasher in accordance with a travel plan generated by the control planning unit G3 or the surrounding environment. In addition, the automated driving ECU 30 includes functional units corresponding to ACC, LTA, and LTC as sub-functions for providing the automated driving function.

The mode switching unit G5 is a configuration to switch the driving mode based on an instruction from the HCU 20. For example, during the automated driving mode, the mode switching unit G5 switches to a driving mode according to the user's operation, based on the instruction from the HCU 20.

The automated driving ECU 30 may change a combination of outside-monitoring sensors 11 to be operated and a sensing interval depending on the driving mode. For example, in the automated driving mode, the automated driving ECU 30 fully operates all the outside-monitoring sensors 11. In the fully manual mode, the automated driving ECU 30 reduces a frequency of driving the outside-monitoring sensors 11 for the lateral and rear areas compared to the automated driving mode. Reducing the frequency of driving an outside-monitoring sensor 11 includes stopping the sensor. A part or all of the outside-monitoring sensors 11 for the front area may be operated at a predetermined frequency even in the fully manual mode in order to operate an advanced emergency braking system. The outside-monitoring sensors 11 for the front area are sensors that are configured to mainly detect objects in front of the subject vehicle. The outside-monitoring sensors 11 for the lateral/rear areas are sensors that are configured to mainly detect objects in lateral/rear of the subject vehicle.

<Configuration of HCU>

Figure 4:
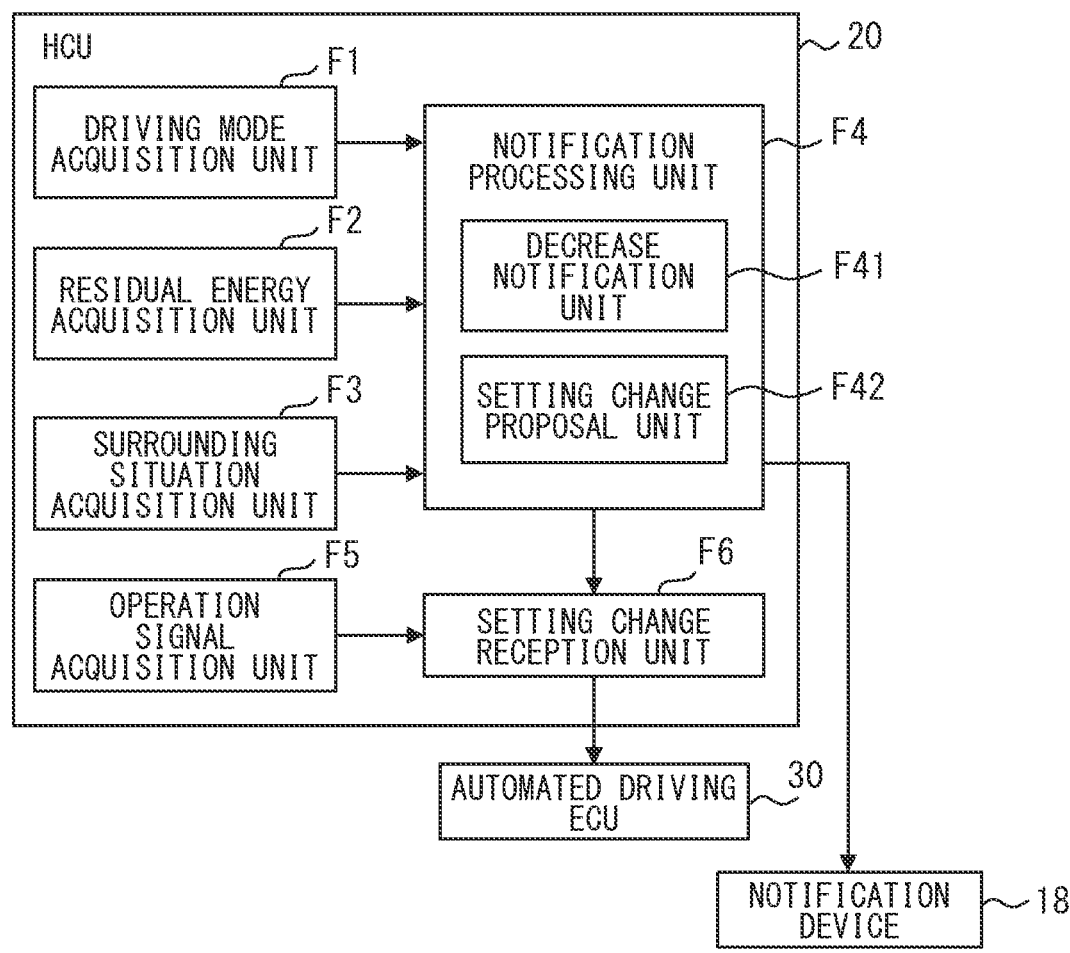
FIG. 4 is a functional block diagram of an HCU.

Here, functions and operations of the HCU 20 will be described. The HCU 20 provides functions corresponding to various functional blocks shown in FIG. 4 by executing the vehicle control program stored in the storage 23. That is, the HCU 20 includes, as the functional blocks, a driving mode acquisition unit F1, a residual energy acquisition unit F2, a surrounding situation acquisition unit F3, a notification processing unit F4, an operation signal acquisition unit F5, and a setting change reception unit F6.

The driving mode acquisition unit F1 acquires data indicating a current mode from the automated driving ECU 30. The current mode is a current driving mode of the automated driving ECU 30. The residual energy acquisition unit F2 acquires the residual power based on the residual amount signal input from the battery ECU 14.

The surrounding situation acquisition unit F3 acquires information about the surrounding environment. For example, the surrounding situation acquisition unit F3 may acquire the information about the surrounding environment from the automated driving ECU 30, the outside-monitoring sensor 11, the locator 13, or the V2X onboard device 16. The information about the surrounding environment includes, for example, a type or structure of the traveling road, the traveling speed of the subject vehicle, and whether the subject vehicle is in the traffic congestion. The type of the traveling road means whether the traveling road is the motorway. The type of the traveling road is specified by referring to the map data, for example.

Various information sequentially acquired by the driving mode acquisition unit F1, the residual energy acquisition unit F2, and the surrounding situation acquisition unit F3 is stored in a memory such as the RAM 22 and is used by the notification processing unit F4 and the setting change reception unit F6. The various information can be classified by type and stored in the memory. For example, the various information can be sorted and stored with the latest data first, for example. The data in which a certain time elapses after acquisition can be discarded from the memory.

The notification processing unit F4 is configured to generate information to be notified to the user and to output a control signal corresponding to the generated information to the notification device 18. That is, the notification processing unit F4 corresponds to a configuration which executes processing for notifying the user of information related to the operating state of the automated driving system 1 and the residual power. The notification processing unit F4 includes, as sub-functions, a decrease notification unit F41 and a setting change proposal unit F42.

The decrease notification unit F41 notifies the user that the residual power has decreased when the residual power becomes equal to or less than a predetermined notification threshold. For convenience, a notification of decreasing in the residual power is referred to as a decrease notification. The decrease notification unit F41 changes a set value of the notification threshold according to whether the current mode is the user-involvement mode or the automated driving mode. When the current mode is the user-involvement mode, the decrease notification unit F41 performs the decrease notification based on a fact that the residual power becomes equal to or less than a predetermined first notification threshold. On the other hand, when the current mode is the automated driving mode, the decrease notification unit F41 performs the decrease notification based on a fact that the residual power becomes equal to or less than a second notification threshold. The second notification threshold is set greater than the first notification threshold.

The first notification threshold is set to a value corresponding to 10% or 15% of a full charge capacity, for example. The second notification threshold is set to a value corresponding to 20% or 25% of the full charge capacity, for example. The second notification threshold may be set to a value in which a predetermined margin (e.g., 10 points) is added to the first notification threshold. The second notification threshold may be set to a value that is 1.5 or 2 times the first notification threshold.

The above configurations have been created based on the following technical idea. During the automated driving mode, the user is not required to look ahead of the subject vehicle and may be allowed to perform a predetermined action as the second task, such as operating a smartphone. Therefore, the user is less likely to grasp how much power is left and how fast it is decreasing. As a result, when the user pays attention to the residual power, the residual power may already be at or just before a level where a charging is required. To address such issues, in the above configuration, the notification threshold used in the automated driving mode is set larger than the notification threshold used in the user-involvement mode. According to this configuration, a timing of execution of the decrease notification is earlier in the automated driving mode than in the user-involvement mode. By notifying the user of a decrease in the residual power earlier in the automated driving mode than in user-involvement mode, it is possible to make the user aware of the residual power and reduce a risk of the user being confused by an unexpected drop in the residual power.

In the above concept, the notifying threshold is set for the residual power in this embodiment, but it is set for a parameter other than the residual power. The residual power corresponds to a cruising range or a cruising time. The cruising range indicates a distance that the subject vehicle can travel with the residual power. The cruising time indicates a remaining time that the subject vehicle can travel with the residual power. Therefore, the notification threshold may be set for the cruising distance/time. In that case, the notification processing unit F4 may convert the residual power acquired by the residual energy acquisition unit F2 into the cruising distance/time, and then compare it with a notification threshold. A configuration notifying information related to the residual power when the cruising range/time becomes equal to or less than the notification threshold is also included in the concept of notifying information related to the residual power when the residual power becomes equal to or less than the notification threshold.

The decrease notification unit F41 may change a manner of the decrease notification depending on whether the current mode is the user-involvement mode or the automated driving mode. When the current mode is the user-involvement mode, the user is likely to be looking forward, so the decrease notification unit F41 does not output a voice message indicating that the residual power has decreased while displaying an image of the decrease notification on the HUD 18A or the meter display 18B. For example, the decrease notification unit F41 outputs a predetermined notification sound and displays a message image indicating that the residual power has decreased on the HUD 18A when the current mode is the user-involvement mode. The decrease notification unit F41 may display a predetermined icon image indicating that the residual power has decreased instead of or together with the message image. For convenience, the message image and the icon image indicating that the residual power has decreased is called a decrease notification image. The decrease notification image may include an image displaying a specific value of the residual power in percent, or it may include the cruising range or the cruising time.

On the other hand, when the current mode is the automated driving mode, the user may not be looking ahead. Therefore, the decrease notification unit F41, for example, displays the message image on the HUD 18A and output the voice message from the sound device 18C. According to this configuration, even when the user is performing the second task in the automated driving mode, it becomes easier for the user to notice a decrease in the residual power. In the user-involvement mode, the decrease notification unit F41 notifies the user that the residual power has decreased by displaying the image without outputting the voice message. Thus, a risk that the user feels annoyed is reduced.

The HCU 20 continues to display the decrease notification image while the residual power is equal to or less than the notification threshold corresponding to the driving mode. Of course, the HCU 20 may be configured to terminate displaying of the decrease notification image based on the user's operation.

When the user switches the operation mode from the automated driving mode to the user-involvement mode while displaying the decrease notification image, the value of the notification threshold is reduced from the second notification threshold to the first notification threshold. When the residual power is between the first notification threshold and the second notification threshold, the residual power is above the notification threshold upon the driving mode being switched to the user-involvement mode, and a condition for the decease notification is not satisfied. In this case, the decrease notification unit F41 may cancel the display of the decrease notification image. However, the battery 141 may be charged even after the driving mode is switched to the user-involvement mode.

For this reason, once the HCU 20 displays the decrease notification image, the HCU 20 continues to display the image until the HCU 20 detects that a charging operation is performed by the user or that a traveling power supply is set to off. Displaying the decrease notification image continuously includes intermittently displaying it. The traveling power supply is an ignition power supply in an engine vehicle. In a hybrid vehicle or an electric vehicle, a system main relay corresponds to the traveling power supply.

The HCU 20 may change a display mode of the decrease notification image according to an elapsed time from the start of display of the decrease notification image. For example, HCU 20 may display the decrease notification image prominently and relatively large immediately after the start of displaying it. Then, the HCU 20 may reduce a display size of the decrease notification image after a predetermined time has elapsed from the start. The HCU 20 may display both a text as the message image and the icon image immediately after the start of notification, while only the icon image may be displayed after the predetermined time has elapsed. The display of the icon image may be replaced by a lighting of a predetermined indicator. The HCU 20 may change the display mode of the decrease notification image to a less conspicuous mode when the driving mode is switched from the automated driving mode to the user-involvement mode. In other technical thought, when the user switches the driving mode to the user-involvement mode based on the execution of the decrease notification, the user is likely to be aware of the status of the residual power. Therefore, the HCU 20 may cancel the display of the decrease notification image when the driving mode is switched to the user-involvement mode within a predetermined time after the decrease notification is executed.

The setting change proposal unit F42 proposes terminating the automated driving mode and shifting to the user-involvement mode based on a fact that the residual power becomes less than or equal to a predetermined proposal threshold in the automated driving mode. For convenience, proposing a termination of the automated driving mode is referred to as an AD termination proposal. A driving mode that is set after the termination of the automated driving mode may be predetermined or selected by the user each time. For example, a driving mode set after terminating of the automated driving mode may be the fully manual mode.

The above configurations have been created based on the following technical idea. In the automated driving mode, the system needs to sequentially sense the surrounding environment, such as other vehicles and structures that exist around the subject vehicle. Therefore, the automated driving ECU 30 needs to drive a relatively large number of outside-monitoring sensors 11 at a high frequency. On the other hand, in the user-involvement mode such as the fully manual mode, the driving operation is mainly performed by the user. Therefore, in the user-involvement mode, the number of outside-monitoring sensors 11 to be driven and a frequency of sensing may be less than in the automated driving mode. Of course, a power consumption increases with increase in the number of outside-monitoring sensors 11 to be driven and the frequency of sensing.

In view of such circumstances, the power consumption can be less in the user-involvement mode than in the automated driving mode. Reducing the frequency of sensing corresponds to, for example, lengthening the sensing interval. The lower the automation level of an after-terminating mode is, the more power savings can be expected. The after-termination mode here means the driving mode set after the termination of the automated driving mode. A range that the system must monitor decreases with decrease in the automation level. Therefore, the number of the outside-monitoring sensors 11 to be driven and a processing load for the object recognition can be reduced with decrease in the automation level. From the viewpoint of reducing the power consumption, the after-termination mode may be the fully manual mode.

Of course, after the AD termination proposal, termination of the automated driving mode is determined by the user operation on the input device 19. For example, the HCU 20 switches the driving mode from the automated driving mode to the fully manual mode when the HCU 20 receives an input of an operation signal from the input device 19 indicating that the user has performed an operation for terminating the automated driving mode in response to the AD termination proposal.

The AD termination proposal may be implemented using both a voice message output and image display. For example, the HCU 20 may display a message image such as "Battery level is low. Would you like to switch to manual operation?", and output a voice message with similar content. Since the user may not be looking ahead during the automated driving mode, the AD termination proposal may include the voice message output in addition to the image display.

The proposal threshold may be the same as the notification threshold described above or may be larger than the notification threshold by a predetermined amount. Also, the proposal threshold may be smaller than the notification threshold by a predetermined amount.

Furthermore, the proposal threshold may be changed according to whether the surround environment is congested or not. The proposal threshold may be set to a larger value when the surround environment is congested than when the surround environment is not congested. In the automated driving mode, the automated driving ECU 30 tries to control the subject vehicle to move at a predetermined speed while maintaining the set distance from the preceding vehicle. In the traffic congestion, the subject vehicle may repeatedly stop and start in small steps. On the other hand, in the fully manual mode, the inter-vehicle distance and the speed can be flexibly controlled by the user, so the frequency of stopping and starting can be reduced more than in the automated driving mode. Since the coefficient of static friction is greater than the coefficient of dynamic friction, more electric power can be consumed when the subject vehicle is starting than when it is running. Considering this situation, the power consumption can be reduced by switching the driving mode from the automated driving mode to the fully manual mode in the traffic congestion. In the configuration in which the proposal threshold is set to a larger value when the surrounding environment is congested than when the surrounding environment is not congested, the termination proposal is executed earlier when the surround environment is congested than when the surrounding environment is not congested. As a result, the power consumption can be reduced furthermore.

From another perspective, it can be assumed that the user wants to actively utilize the automated driving mode in the traffic congestion. Considering such demands, it is not consistent with the user expectations if the AD termination proposal is presented earlier when the surround environment is congested than when the surrounding environment is not congested. Therefore, the proposal threshold may be set to a smaller value when the surround environment is congested than when the surrounding environment is not congested.

In other embodiments, the setting change proposal unit F42 may propose switching the driving mode to the fully manual mode or the first assistance mode when the residual power is equal to or less than the proposal threshold, even in the second/third assistance mode. For convenience, a proposal of switching the driving mode from the level 2 mode, such as the second/third assistance mode, to the level 1 mode or the full manual mode is also referred to as a steering-assist termination proposal. Since the steering-assist termination proposal and the AD termination proposal are proposals to lower the automation level, each of them can be called an automation-level lowering proposal.

In the level 2 mode, the system is required to monitor the left and right directions of the subject vehicle in addition to the front and rear directions. That is, in the level 2 mode, the range to be monitored by the system is wider than in the level 1 mode and the level 0 mode, and the number of the outside-monitoring sensors 11 to be driven and the processing load for object recognition may increase.

By executing the automation-level lowering proposal in response to the decrease in the residual power, the user is more likely to lower the automation level than when the proposal is not presented. As the result, a speed of the power consumption can be reduced. When the automation level is lowered based on the user's operation, the functions provided by the system will be degraded, but the speed of power consumption can be reduced. Thus, the cruising range can be extended.

The setting change proposal unit F42 changes a set value of the proposal threshold depending on whether the current mode is the user-involvement mode or the automated driving mode. That is, the proposal threshold for the AD termination proposal and the proposal threshold for the steering-assist termination proposal may be different. The proposal threshold for the AD termination proposal may be set larger by a predetermined amount than the proposal threshold for the steering-assist termination proposal.

A manner of the AD termination proposal may be different from a manner of the steering-assist termination proposal. For example, the AD termination proposal includes outputting both the voice message and the image display for proposing termination of the automated driving mode. This is because the user may not be looking ahead of the subject vehicle in the automated driving mode. On the other hand, in the Level 2 mode, the user is likely to be looking ahead. Therefore, the steering-assist termination proposal may be outputting a predetermined message image or icon image, without outputting a voice message.

The AD termination proposal and the steering-assist termination proposal may include presenting information about a degree of extension in cruising range due to termination of the current mode. The degree of extension in cruising range may be defined as a difference between a cruising range when the current mode is kept and a cruising range when the current mode is changed to a predetermined after-termination mode. The AD termination proposal or the steering-assist termination proposal may be a process in which the system presents the user with the cruising range for each driving mode and then asks the user whether to maintain the current mode or switch to a driving mode with a lower automation level. The AD termination proposal or the steering-assist termination proposal may include presenting information indicating how to switch driving modes for the user. For example, the HCU 20 may output a message such as "To switch to manual driving mode, please hold your hand on the steering wheel for at least 3 seconds". Of course, a user operation to switch to the manual driving mode is not limited to the above example. The user operation to switch to the manual driving may be pressing of the mode change switch 19A with his/her hand on the steering wheel or stepping lightly on the brake or accelerator pedal.

The operation signal acquisition unit F5 acquires an operation signal indicating the details of the user's operation on the input device 19 from various input devices 19. That is, the operation signal acquisition unit F5 acquires a signal indicating the user's operation state with respect to the mode change switch 19A, the steering wheel, and the pedals. When the automated driving system 1 includes the voice input device as the input device 19, the operation signal acquisition unit F5 also acquires the user's utterance contents. The operation signal acquired by the operation signal acquisition unit F5 is used by the setting change reception unit F6 as a user's response to the proposal made by the setting change proposal unit F42.

The setting change reception unit F6 instructs the automated driving ECU 30 to change the driving mode based on a fact that the operation signal acquisition unit F5 has acquired an operation signal. This operation signal indicates that the user requests to switch the driving mode in response to the proposal of the setting change proposal unit F42. For example, the setting change reception unit F6 outputs an instruction signal to the automated driving ECU 30 to shift to the fully manual mode based on a fact the operation signal acquisition unit F5 detects gripping of the steering wheel by the user within a predetermined response waiting time after the AD termination proposal is implemented. The automated driving ECU 30 changes the driving mode according to the instruction signal input from the HCU 20.

The HCU 20 does not necessarily have to include both the decrease notification unit F41 and the setting change proposal unit F42. The HCU 20 may not have either the decrease notification unit F41 or the setting change proposal unit F42. When the HCU 20 has both the decrease notification unit F41 and the setting change proposal unit F42, a priority unit to be activated among these two units may be set by the system designer or selected by the user. For example, the HCU 20 may be configured to allow the user to select, via a predetermined configuration screen, whether the HCU 20 performs the decrease notification or the automation-level lowering proposal as the system's actions responding to the decrease in the residual power. Also, various thresholds may be configured to be changed by the user. When the user can set the notification threshold, the HCU 20 may be configured to allow the user to set the second notification threshold within a range greater than the first notification threshold. The same applies to the proposal threshold.

<Example of Operation of HCU>

Figure 5:
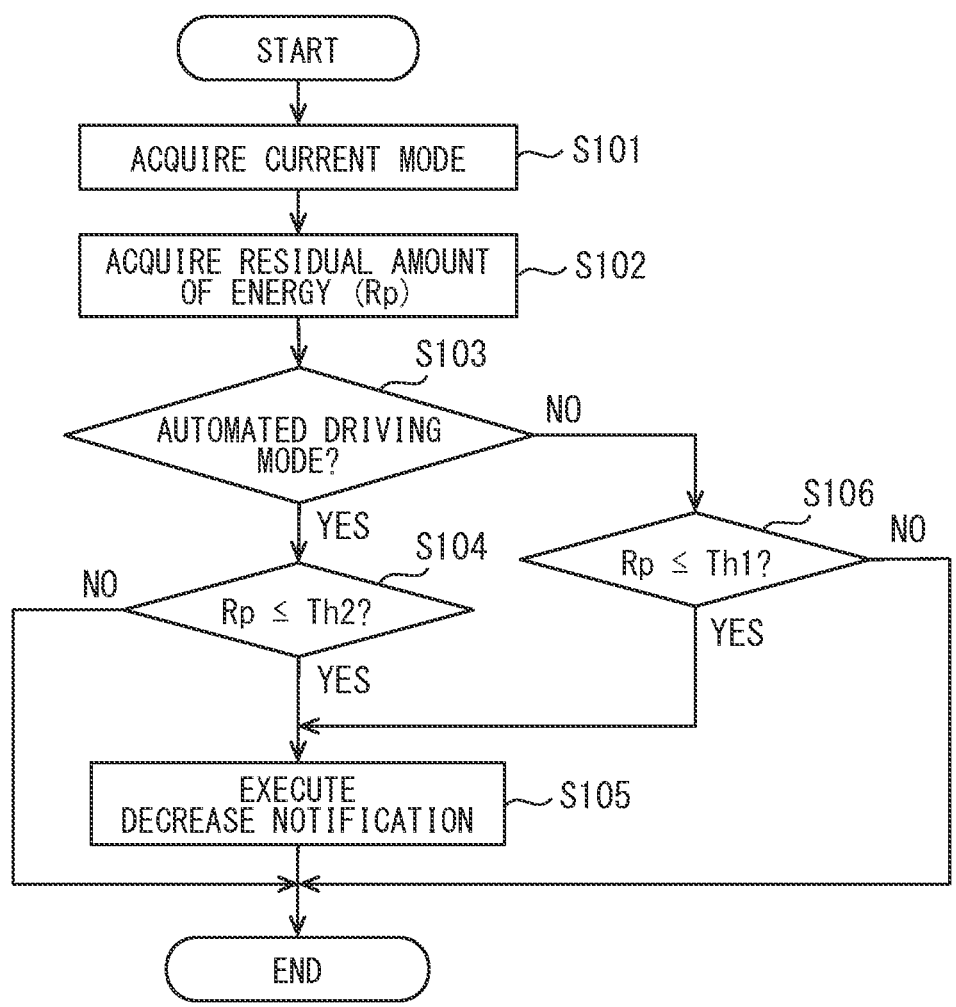
FIG. 5 is a flowchart of a processing related to a decrease notification.

Next, a process related to the decrease notification is explained using the flowchart shown in FIG. 5. The process related to the decrease notification is performed by the HCU 20. The flowchart shown in FIG. 5 may be started at a predetermined cycle, such as every second, every 10 seconds, or every minute. As an example, the process related to the decrease notification includes steps S101, S102, S103, S104, S105, and S106. A number and order of steps comprising the process related to the decrease notification can be changed as appropriate.

First, in step S101, the driving mode acquisition unit F1 acquires information indicating the current mode from the automated driving ECU 30. When step S101 is performed, the process proceeds to step S102. In step S102, the residual energy acquisition unit F2 acquires information indicating the residual power from the battery ECU 14. When step S102 is performed, the process proceeds to step S103. "Rp" shown in the flowchart means the residual power (i.e., residual amount of energy).

In step S103, based on the information obtained in the step S101, the notification processing unit F4 determines whether the current mode is the automated driving mode. When the current mode is the automated driving mode, an affirmative determination is made in S103, and the process proceeds to S104. On the other hand, when the current mode is not the automated driving mode, a negative determination is made in step S103, and the process proceeds to step S106.

In step S104, the notification processing unit F4 determines whether the residual power Rp acquired in step S102 is equal to or less than the second notification threshold Th2. When the residual power Rp is equal to or less than the second notification threshold Th2, an affirmative determination is made in step S104, and step S105 is executed. On the other hand, the residual power Rp is larger than the second notification threshold Th2, a negative determination is made in step S104, and this flow is terminated. The second notification threshold Th2 used in step S104, is set to a value larger than the first notification threshold Th1 used in step S106. The second notification threshold Th2 can also be called a notification threshold for the automated driving.

In step S105, the notification processing unit F4 executes the decrease notification. When the process transitions from step S104 to step S105, the notification processing unit F4 executes the decrease notification including not only displaying the decrease notification image on the HUD 18A but also outputting the voice message indicating that the residual power is equal to or less than a predetermined value. This is because, as described above, the user is less likely to notice the display on the display when the current mode is the automated driving mode.

In step S106, the notification processing unit F4 determines whether the residual power Rp acquired in step S102 is equal to or less than the first notification threshold Th1. When the residual power Rp is equal to or less than the first notification threshold Th1, an affirmative determination is made in step S106, and step S105 is executed. On the other hand, the residual power Rp is larger than the first notification threshold Th1, a negative determination is made in step S106, and this flow is terminated. The first notification threshold Th1 is set to be smaller than the second notification threshold Th2 by a predetermined amount. The first notification threshold Th1 can also be called a notification threshold for the manual driving.

When the process transitions from step S106 to step S105, the notification processing unit F4 displays the decrease notification image on the HUD 18A along with the output of the notification sound but does not output the voice message. This is because, as described above, when the current mode is the user-involvement mode, the user is likely to notice the display of the decrease notification image. Outputting the voice message additionally may bother the user. The output of the notification sound is also an arbitrary element and may be omitted.

The HCU 20 may change a size and content of the decrease notification image whether the current mode is the automated driving mode or the user-involvement mode. For example, the HCU 20 may display a relatively large image containing text as the decrease notification image in the automated driving mode. On the other hand, in the user-involvement mode, the HCU 20 may display a relatively small image, such as an icon image, as the decrease notification image. In the user-involvement mode, the display size of the decrease notification image may not be too large because the user needs to look forward. On the other hand, during the automated driving mode, a visibility and recognizability of the decrease notification image may be prioritized over a visibility of the forward view since the user does not need to look forward.

Figure 6:
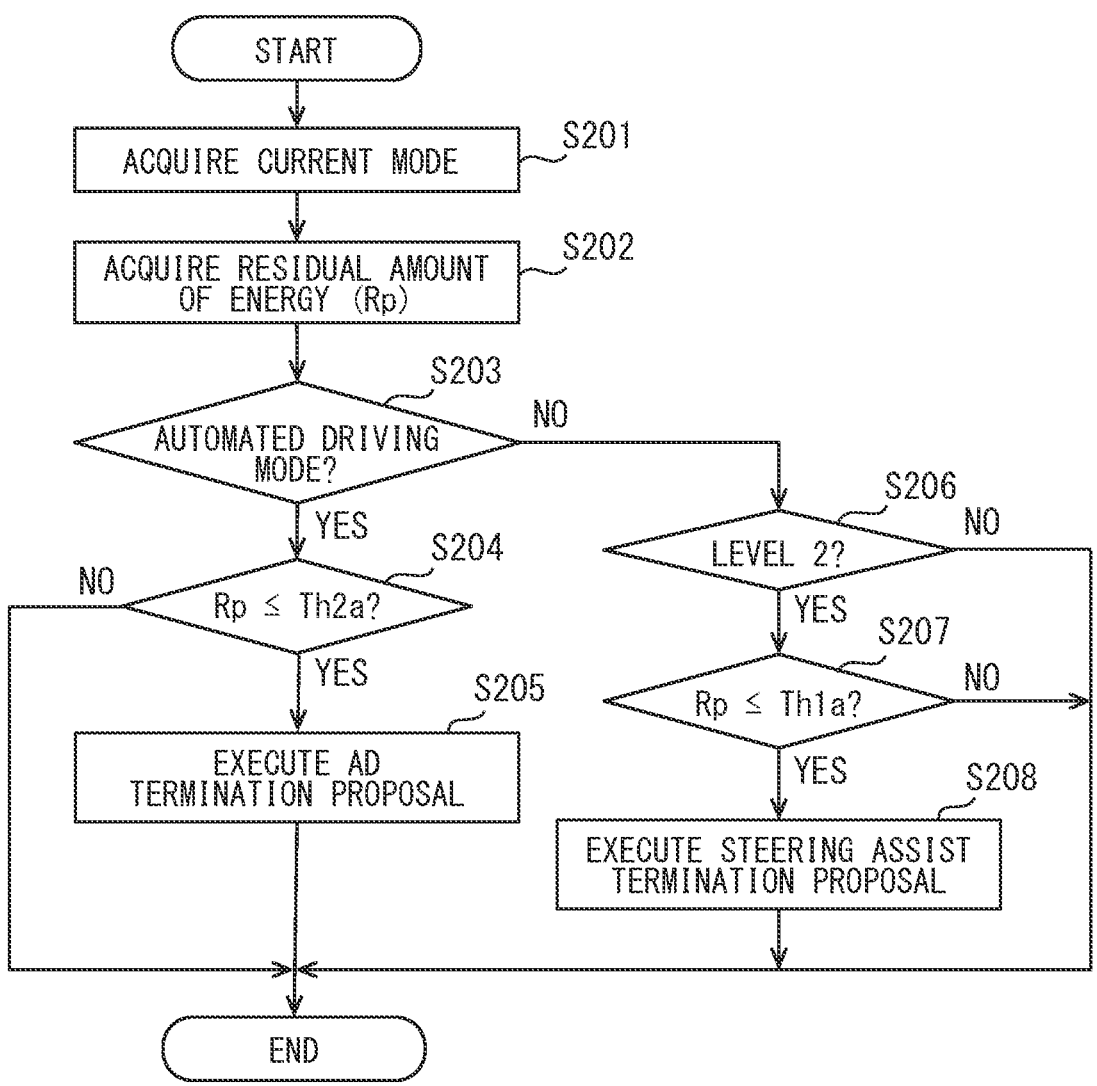
FIG. 6 is a flowchart for explaining an operation of the HCU.

Next, a process related to the AD termination proposal is explained using the flowchart shown in FIG. 6. This process is performed by the HCU 20. The flowchart shown in FIG. 6 may be started at a predetermined cycle based on the user settings, such as every second, every 10 seconds, or every minute. As an example, the process related to the AD termination proposal includes steps S201, S202, S203, S204, S205, S206, S207, and S208. A number and order of steps comprising the process related to the AD termination proposal can be changed as appropriate.

First, in step S201, the driving mode acquisition unit F1 acquires information indicating the current mode from the automated driving ECU 30. When step S201 is performed, the process proceeds to step S202. In step S202, the residual energy acquisition unit F2 acquires information indicating the residual power from the battery ECU 14. When step S202 is performed, the process proceeds to step S203.

In step S203, based on the information obtained in the step S201, the notification processing unit F4 determines whether the current mode is the automated driving mode. When the current mode is the automated driving mode, an affirmative determination is made in S203, and the process proceeds to S204. On the other hand, when the current mode is not the automated driving mode, a negative determination is made in step S203, and the process proceeds to step S206.

In step S204, the notification processing unit F4 determines whether the residual power Rp acquired in step S202 is equal to or less than a second proposal threshold Th2a. When the residual power Rp is equal to or less than the second proposal threshold Th2a, an affirmative determination is made in step S204, and step S205 is executed. On the other hand, when the residual power Rp is larger than the second proposal threshold Th2a, a negative determination is made in step S204, and this flow is terminated. The second proposal threshold Th2a used in the S204 is the threshold for implementing the AD termination proposal. The second proposal threshold Th2a is set to a value that is a predetermined amount larger than a first proposal threshold Th1a described below. The second proposal threshold Th2a may be the same value as the second notification threshold Th2 or may be smaller by a predetermined amount than the second notification threshold Th2. In this disclosure, the second notification threshold Th2 and the second proposal threshold Th2a are collectively referred to as a second operating threshold. The second proposal threshold Th2a can also be called a proposal threshold for the automated driving.

In step S205, the notification processing unit F4 executes the AD termination proposal. For example, in step S205, the HCU 20 displays a message image on the HUD 18A recommending a deactivation of the automated driving function due to a low battery, and further outputs and voice message with similar content. This is because, as described above, the user is less likely to notice the image on the display during the automated driving mode.

In step S206, the notification processing unit F4 determines whether the current mode is the level 2 mode or not. When the current mode is the level 2 mode, an affirmative determination is made in S206, and the process proceeds to S207. On the other hand, when the current mode is not the level 2 mode, a negative determination is made in step S206, and this flow is terminated.

In step S207, the notification processing unit F4 determines whether the residual power Rp acquired in step S202 is equal to or less than the first proposal threshold Th1a. When the residual power Rp is equal to or less than the first proposal threshold Th1a, an affirmative determination is made in step S207, and step S208 is executed. On the other hand, the residual power Rp is larger than the first proposal threshold Th1a, a negative determination is made in step S207, and this flow is terminated. The first proposal threshold Th1a used in the S207 is the threshold for implementing the steering-assist termination proposal. The first proposal threshold Th1a is set to a value that is a predetermined amount smaller than the second proposal threshold Th2a described above. The first proposal threshold Th1a may be the same value as the first notification threshold Th1 or may be smaller by a predetermined amount than the first notification threshold Th1. In this disclosure, the first notification threshold Th1 and the first proposal threshold Th1a are collectively referred to as a first operating threshold. The second operating threshold mentioned above may be set to be greater than the first operating threshold.

In step S208, the notification processing unit F4 executes the steering-assist termination proposal. For example, in S208, the HCU 20 displays a message image on the HUD 18A, recommending a deactivation of the steering assist function along with an output of a predetermined notification sound. However, the sound output from the sound device 18C at S208 is at most a notification sound, not a voice message. This is because, as described above, during the user-involvement mode, the user is likely to notice the image on the display and outputting the voice message may bother the user. The output of the notification sound is also an arbitrary element and may be omitted. An image displayed on the HUD 18A in the steering-assist termination proposal may include text or may be only a predetermined icon image. Of course, the image may include both text and graphics.

Steps S206, S207, and S208 are arbitrary elements and may be omitted. In a configuration in which steps S206 to S208 are omitted, this flow can be terminated when the current mode is not the automated driving mode in S203.

Effects

In the above configuration, the threshold for notifying the decrease in the residual power during the automated driving mode is set larger than the threshold for executing the above notification during the user-involvement mode. According to this configuration, notification of the decrease in the residual power is started earlier during the automated driving mode than during the user-involvement mode. Therefore, the user is more likely to be aware of the current value of the residual power before it drops to a level that requires recharging.

In one configuration, once the HCU 20 executes the decrease notification after the start of driving, the HCU 20 continues to display the decrease notification image until the HCU 20 detects the user operation for charging the battery or turning off the traveling power supply. According to this configuration, a risk of the decrease notification image display being canceled when the operation mode is switched from the automated driving mode to the user-involvement mode can be reduced.

In one operation mode of the HCU 20, the HCU 20 proposes termination of the automated driving mode when the residual power becomes equal to or less than the predetermined proposal threshold. According to this operation mode, the user is more likely to switch the driving mode to the user-involvement mode. As a result, since an operation rate of the outside-monitoring sensors 11 and the processing load related to object recognition can be reduced, the power consumption can be reduced. In addition, a decreasing speed of the residual power can be reduced.

Furthermore, in one operation mode of the HCU 20, the HCU 20 changes the proposal threshold, i.e., a timing proposing the termination of the automated driving, depending on whether the surround environment (i.e., driving section) is congested. For example, when the subject vehicle is in a congested road section, the proposal threshold is set larger by a predetermined amount than when the subject vehicle is not in the congested road section. According to this configuration, the user is more likely to switch to the user-involvement mode during traffic congestion. Compared to the automated driving mode, in the user-involvement mode, the acceleration and deceleration are flexibly performed according to the user's judgment, so an effect of improving energy efficiency can be expected. In another example, when the subject vehicle is in the congested road section, the proposal threshold is set smaller by a predetermined amount than when the subject vehicle is not in the congested road section. According to this configuration, the system response can be adapted to the user's needs.

While one embodiment of the present disclosure has been described above, the present disclosure is not limited to the embodiment described above, and various modifications to be described below are included in the technical scope of the present disclosure and may be implemented by various modifications within a scope not departing from the spirit of the present disclosure, in addition to the modifications to be described below. For example, various supplements and/or modifications to be described below can be implemented in combination as appropriate within a scope that does not cause technical inconsistency. The members having the same functions as described above are denoted by the same reference numerals, and the description of the same members will be omitted. Further, when only a part of the configuration is mentioned, the above description can be applied to the other parts.

<Other Examples of Proposal>

The above discloses a configuration in which the HCU 20 proposes lowering the automation level in order to reduce the power consumption per unit of time/unit distance. However, components in the subject vehicle that consume battery power are not limited to the components for automated driving. For example, air conditioning units 151 and audio device also consume power charged in the battery 141. The setting change proposal unit F42 may propose, for example, turning down or stopping the air conditioning when the residual power is equal to or less than the proposal threshold during the automated driving mode. Similarly, when the audio device is running during the automated driving mode and the residual power is equal to or less than the proposal threshold, the HCU 20 may propose turning off the audio device.

In relation to the above technical idea, the automated driving system 1 may be configured to have a power saving mode and a normal mode as control modes for an in-vehicle electrical equipment, and to be capable of switching a control mode between these modes. The power saving mode is a control mode for reducing power consumption of the entire subject vehicle. The normal mode corresponds to a control mode other than the power saving mode. The normal mode corresponds to a control mode in which the in-vehicle electrical equipment is operated based on the user's operation.

For example, the power saving mode may be a control mode in which the air conditioner 151 is stopped, or a control mode in which an airflow or target temperature of the air conditioner 151 is automatically adjusted such that the power consumption is reduced. Operation settings of the air conditioner 151 is changed by cooperation between the HCU 20 and the air conditioning ECU 15. The air conditioning ECU 15 changes a control manner of the air conditioner 151 according to whether the control mode is the power saving mode or the normal mode. In addition, the power saving mode may be a control mode in which the HCU 20 stops the audio device, or a part of the functions using the in-vehicle display, such as watching moving images.

In addition, the power saving mode may be a control mode in which the HCU 20 reduces a frequency of communication with an external server using the V2X onboard device 16, or places communication restrictions on a certain application that performs data communication with an external device. For example, the power saving mode may be a control mode in which the system prohibits data communications for web browsing and playback of video contents, while allowing execution of communications for obtaining data necessary for vehicle driving control, such as dynamic map data. The dynamic map data here is data about items whose status changes dynamically. The dynamic map data may include, for example, data on at least some of the following items related to a section through which the subject vehicle is scheduled to pass: a road surface condition, weather, dropped objects, congested road sections, lane restrictions, construction sections, cruising speed, traffic light conditions, and the presence or absence of merging vehicles.

In a configuration in which the automated driving system 1 has the power saving mode, the HCU 20 may propose switching to the power saving mode based on a fact that the residual power becomes equal to or less than the proposal threshold in the automated driving mode. A process of the proposal of switching to the power saving mode may include an operation stimulating the user hearing such as outputting sound effects or voice messages. The HCU 20 may propose changing a travel route to a route passing through a charging station based on a fact that the residual power is equal to or less than the proposal threshold during the automated driving mode. The charging station is a facility with an equipment for charging battery 141. Data of the charging station may be registered in the map data. The charging station may be a dedicated facility that provides charging services. The charging station may also be a rest area, a restaurant or a commercial facility that has the equipment for charging.

The HCU 20 may propose lengthening or maximizing the target value of the inter-vehicle distance, based on the fact the residual power is equal to or less than the proposal threshold during the automated driving mode. Lengthening the target value of the inter-vehicle is equivalent to increasing it by a predetermined amount from a current setting. When the target value of the inter-vehicle distance is lengthened, a possibility of operating sudden acceleration/deceleration control to avoid a collision can be reduced. As a result, an improvement in fuel efficiency can be expected. When the subject vehicle is the electric vehicle, the above expression "fuel efficiency" may be interpreted as a cruising distance per unit of electric power (so-called "MPGe"). Of course, in engine vehicles and hybrid vehicles, the fuel efficiency means a cruising distance per unit amount of fuel for driving such as gasoline or light oil.

The HCU 20 may propose changing the target value of the traveling speed to a value that is a predetermined amount lower than the current setting, or to a minimum value in an allowable range, based on the fact that the residual power is equal to or less than the proposal threshold during the automated driving mode. In automobiles, air resistance increases and fuel efficiency (MPGe) decreases with increase in traveling speed. For example, when the set value of the traveling speed is reduced by 10 km/h, the improvement of the fuel efficiency and the reduction of the decreasing speed of the residual power can be expected.

The automated driving system 1 may have a normal mode and a control relaxed mode as more detailed modes of the automated driving mode and be capable of switching between these modes. The normal mode is an automated driving mode in which the system controls the subject vehicle such that a control parameter relatively strictly approaches to a predetermined target value that is set depending on the situation. The control parameter is the traveling speed or the inter-vehicle distance, for example. A control to make the control parameter strictly approach to the target value may be, for example, a control in which a settling time of the control parameter, such as the inter-vehicle distance, is less than a predetermined standard value. The settling time means the time required for the control parameter to converge to within 5% of the target value against a disturbance. The normal mode may be a mode in which the system performs acceleration/deceleration such that the control parameter does not deviate from a predetermined allowable range determined around the target value. The normal mode is a mode in which the system strictly controls the control parameter and may be called a strict control mode or strict mode.

On the other hand, the control relaxed mode is a control mode that reduces a strictness in the control to make the traveling speed, inter-vehicle distance, and others approach to the target values. For example, the control relaxed mode corresponds to an automated driving mode that is longer in the settling time than the normal mode by a predetermined amount. The control relaxed mode may be a mode in which values of the control parameter are allowed to temporarily deviate from the predetermined allowable range. The control relaxed mode may be an automated driving mode with a wider control error tolerance than the normal mode.

The control relaxed mode for engine vehicle may be interpreted as an automated driving mode that prioritizes maintaining the engine speed within a predetermined high efficiency range and allows the traveling speed to deviate from a normal allowable range to a predetermined level. The high efficiency range is a range in which the fuel efficiency is optimal or semi-optimal. The high efficiency range is appropriately set by a designer of the subject vehicle. The high efficiency range is also called a green zone. Generally, the high efficiency range is often 2000 rpm to 3000 rpm. The control relaxed mode can be called a semi-strict mode. In one perspective, the control relaxed mode may be called a fuel-efficiency priority mode because it is a driving mode that prioritizes the fuel efficiency over responsiveness to changes in the traveling speed and inter-vehicle distance.

The automated driving system 1 may be configured to be capable of selecting the control relaxed mode in addition to the normal mode as the automated driving mode. In this configuration, the HCU 20 controls may propose switching the driving mode to the control relaxed mode when the residual power becomes equal to or less than the proposal threshold during the automated driving mode. When executing the above proposal, the notification processing unit F4 may present an image to the user that briefly explains the difference between the control relaxed mode and the normal mode, for example, that the acceleration responsiveness becomes low in the control relaxed mode.

Figure 7:
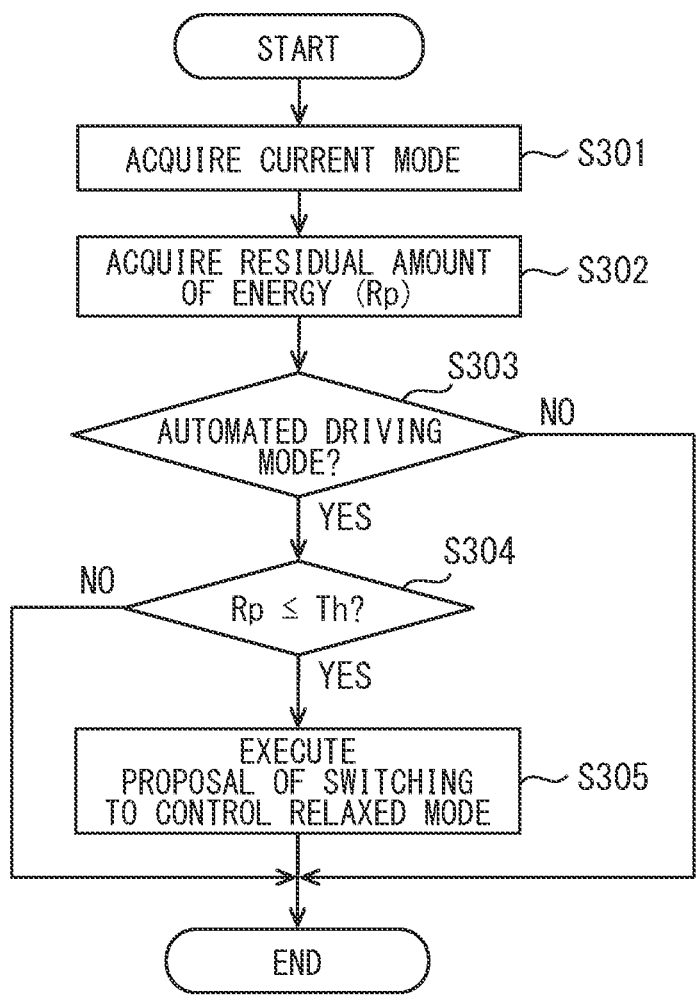
FIG. 7 is a flowchart for explaining another operation of the HCU.

FIG. 7 is a flow chart showing an example of the operation of the HCU 20 when the automated driving system 1 has the control relaxed mode. FIG. 7 shows a series of processes related to the proposal of switching to the control relaxed mode, and includes steps S301, S302, S303, S304, and S305, for example.

First, in step S301, the driving mode acquisition unit F1 acquires information indicating the current mode from the automated driving ECU 30. When step S301 is performed, the process proceeds to step S302. In step S302, the residual energy acquisition unit F2 acquires information indicating the residual power from the battery ECU 14. When step S302 is performed, the process proceeds to step S303.

In step S303, based on the information obtained in the step S301, the notification processing unit F4 determines whether the current mode is the automated driving mode. When the current mode is the automated driving mode, an affirmative determination is made in S303, and the process proceeds to S304. On the other hand, when the current mode is not the automated driving mode, a negative determination is made in step S303, and this flow is terminated.

In step S304, the notification processing unit F4 determines whether the residual power Rp acquired in step S302 is equal to or less than the predetermined proposal threshold Th. When the residual power Rp is equal to or less than the proposal threshold Th, an affirmative determination is made in step S304, and step S305 is executed. On the other hand, the residual power Rp is larger than the proposal threshold Th, a negative determination is made in step S304, and this flow is terminated. The proposal threshold Th used here is a threshold for executing a proposal of switching to the control relaxed mode. The proposal threshold Th may also be called a proposal threshold for easing restrictions.

In step S305, the HCU 20 executes a process of proposing to switch to the control relaxed mode. For example, in step S305, the HCU 20 displays a message image on the HUD 18A recommending switching to the control relaxed mode due to a low battery, and further outputs a voice message with similar content.

In addition, FIG. 7 shows a process of proposing to switch to the control relaxed mode as an example, but an operation of the HCU 20 is not limited to this. A content of the proposal in step S305 may be to stop the air conditioner 151 or to switch the driving mode to the power saving mode. Further, the content of the proposal in step S305 may be to lower the target value of the traveling speed by a predetermined amount or to increase the target value of the inter-vehicle distance by a predetermined amount. Furthermore, the HCU 20 may propose performing the multiple types of setting changes described above in parallel. The user's instructions for changing various settings are received by the setting change reception unit F6 based on operation signals input from the input device 19 and processed.

Although a configuration for implementing various notifications and proposals have been disclosed above, the HCU 20 need not be configured to be capable of executing all of them. The HCU 20 may be configured to perform a part of the above. The HCU 20 may be configured to execute the decrease notification, the proposal of switching to the control relaxed mode, and the AD termination proposal in sequence, as the residual power decreases during the automated driving mode. A threshold for the proposal of switching to the control relaxed mode may be set larger than the threshold for the AD termination proposal, and the threshold for the decrease notification may be set larger than the threshold for the proposal of switching to the control relaxed mode. According to this configuration, the decrease notification, the proposal switch to the control relaxed mode, and the AD termination proposal are performed in this order. By executing proposals to downgrade functions of the system in stages, a risk of abrupt loss of convenience for the user can be reduced.

In the above, the HCU 20 proposes a predetermined setting change, but leaves the user to decide whether to actually change the setting. However, the operation of the HCU 20 is not limited to this. The HCU 20 may be configured to automatically perform a predetermined setting change (in other words, vehicle control) for power saving based on the fact that the residual power becomes equal to or less than a predetermined threshold in the automated driving mode, and then report details of the setting change to the user.

Figure 8:
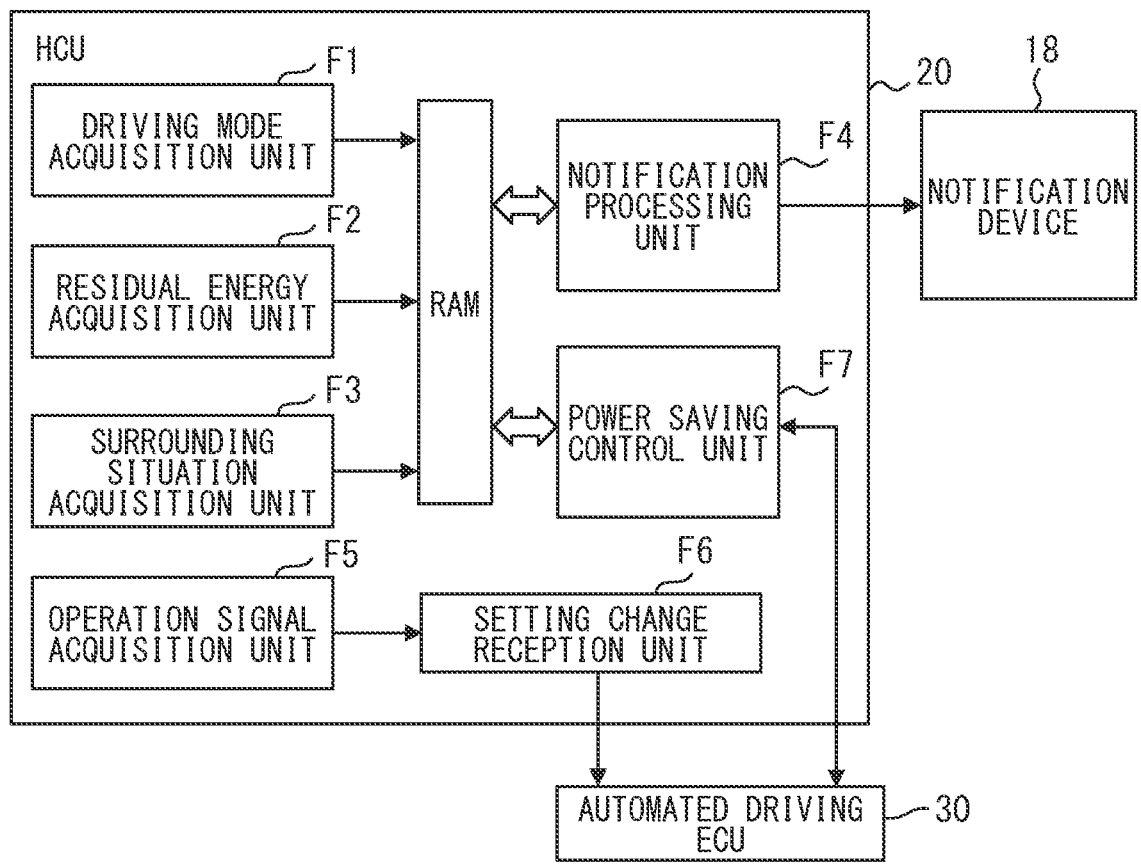
FIG. 8 is a block diagram showing a configuration in which the HCU automatically executes a control for power saving.

FIG. 8 shows functional blocks of the HCU 20 corresponding to the above technical idea. The HCU 20 includes a power saving control unit F7 for automatically executing a predetermined setting change, i.e., vehicle control that can be expected to save power. A vehicle control for power saving here may be a part or all of the various measures described above, such as stopping the air conditioner 151, changing the operating mode of the air conditioner 151, stopping the audio equipment, reducing data communications of low urgency/importance, switching to a control relaxed mode, etc. The power saving control unit corresponds to a vehicle control unit.

In the user-involvement mode, the power saving control unit F7 performs the vehicle control for power saving based on the fact that the residual power becomes equal to or less than the first operating threshold. In the automated driving mode, on the other hand, the power saving control unit F7 performs the vehicle control for power saving based on the fact that the residual power become equal to or less than the second operating threshold. Various processes are performed in cooperation with the relevant ECU(s). For example, the switching to the control relaxed mode is performed in cooperation between HCU 20 and the automated driving ECU 30. The changing of the operating mode of the air conditioner 151 is performed in cooperation between HCU 20 and the air conditioning ECU 15. Changing in communication settings can be performed in cooperation between HCU 20 and an external communication ECU. The external communication ECU controls operation of the V2X onboard device 16.

During the automated driving mode, when the power saving control unit F7 executes the vehicle control for power saving due to the decrease of the residual power, the notification processing unit F4 informs the user of this fact on the image display. At that time, the notification processing unit F4 may output a predetermined effect sound to make it easier for the user to notice the image display while the user performing the second task. Further, the notification processing unit F4 may notify the user with a voice message that the vehicle control for power saving has been executed.

According to the above configuration, processes for power saving is automatically executed as needed. As a result, a time period during which the automated driving mode can be kept can be extended, thereby improving user convenience. The HCU 20 may be configured to allow the user to change, via the predetermined setting screen, the settings whether the vehicle control for power saving is executed without user confirmation or with confirmation.

The above discloses embodiments in which the HCU 20 performs various determinations and controls, but the embodiments included in this disclosure are not limited to those described above. Also, the arrangement of functions in the automated driving system 1 can be changed as appropriate. For example, a part or all of the functions of the HCU 20 may be provided in the automated driving ECU 30. The automated driving ECU 30 may determine whether the decrease notification is required based on the residual power, and output an instruction signal related to the decrease notification to the HCU 20. The same applies to various proposal processes.

Although the above describes mainly the case where the subject vehicle is an electric vehicle, the present disclosure is also applicable to an engine vehicle. The term "residual power" may be replaced with "residual fuel". Information of the residual fuel may be acquired from the remaining fuel sensor or may be acquired from an engine ECU or the like. The residual power or the residual fuel corresponds to a residual amount of energy.

Additional Notes

The device, the system, and the method therefor which have been described in the present disclosure may be also realized by a dedicated computer which constitutes a processor programmed to execute one or more functions concretized by computer programs. The device and the method described in the present disclosure may be implemented using a dedicated hardware logic circuit. Further, the device and the method described in the present disclosure may be implemented by one or more dedicated computers configured by a combination of a processor that executes a computer program and one or more hardware logic circuits. The computer program may be stored in a computer-readable non-transitory tangible recording medium as an instruction to be executed by the computer. Namely, the means and/or the functions which are provided by the HCU 20 may be provided by software stored in tangible memory devices and computers for executing them, only software, only hardware, or a combination thereof. The HCU 20 may be implemented by using an MPU, a GPU, or a data flow processor (DFP) instead of the CPU. The HCU 20 may be realized by combining multiple types of calculation processing devices such as a CPU, an MPU, and a GPU. The HCU 20 may be provided by a system-on-chip (SoC). Further, for example, various processing units may be implemented by using a FPGA (Field-Programmable Gate Array), an ASIC (Application Specific Integrated Circuit), or the like. Various programs may be stored in a non-transitory tangible storage medium. A program storage medium may be an HDD (Hard-disk Drive), an SSD (Solid State Drive), a flash memory, or the like. The non-transitory tangible storage medium also includes ROM such as EPROM (Erasable Programmable Read Only Memory).

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle control device for a vehicle, the vehicle having a user-involvement mode and an automated driving mode as driving modes, the user-involvement mode being a driving mode in which a user sitting in a driver's seat is required to monitor a front of the vehicle, the automated driving mode being a driving mode in which the user is not required to monitor the front of the vehicle, the vehicle control device comprising a processor configured to:
    acquire information of a current driving mode;
    acquire a residual amount of energy that is a residual amount of power stored in a battery for driving or a residual amount of fuel for driving;
    determine whether the current driving mode is the user-involvement mode or the automated driving mode;
    determine whether the residual amount of energy becomes equal to or less than a first predetermined threshold when the current driving mode is determined to be the automated driving mode;
    perform a notification related to a decrease in the residual amount of energy when the current driving mode is the automated driving mode and the residual amount of energy is determined to become equal to or less than the first predetermined threshold;
    determine whether the residual amount of energy becomes equal to or less than a second predetermined threshold smaller than the first predetermined threshold when the current driving mode is determined to be the user-involvement mode; and
    perform the notification related to decrease in the residual amount of energy when the current driving mode is the user-involvement mode and the residual amount of energy is determined to become equal to or less than the second predetermined threshold.

2. The vehicle control device according to claim 1, wherein
    the notification indicates that the residual amount of energy has decreased.

3. The vehicle control device according to claim 2, wherein
    the processor is further configured to:
    perform the notification using both a voice message and an image when the current driving mode is the automated driving mode; and
    perform the notification using the image without outputting the voice message when the current driving mode is the user-involvement mode.

4. A vehicle control device for a vehicle, the vehicle having a user-involvement mode and an automated driving mode as driving modes, the user-involvement mode being a driving mode in which a user sitting in a driver's seat is required to monitor a front of the vehicle, the automated driving mode being a driving mode in which the user is not required to monitor the front of the vehicle, the vehicle control device comprising a processor configured to:
    acquire information of a current driving mode;
    acquire a residual amount of energy that is a residual amount of power stored in a battery for driving or a residual amount of fuel for driving;
    determine whether the current driving mode is the user-involvement mode or the automated driving mode;
    determine whether the residual amount of energy becomes equal to or less than a first predetermined threshold when the current driving mode is determined to be the automated driving mode;
    perform a notification related to a decrease in the residual amount of energy when the current driving mode is the automated driving mode and the residual amount of energy is determined to become equal to or less than the first predetermined threshold;
    determine whether the residual amount of energy becomes equal to or less than a second predetermined threshold smaller than the first predetermined threshold when the current driving mode is determined to be the user-involvement mode;
    perform the notification related to decrease in the residual amount of energy when the current driving mode is the user-involvement mode and the residual amount of energy is determined to become equal to or less than the second predetermined threshold; and
    perform the notification earlier when the current driving mode is the automated driving mode than when the current driving mode is the user-involvement mode, wherein
    the notification indicates that the residual amount of energy has decreased,
    the processor is further configured to:
    perform the notification using both a voice message and an image when the current driving mode is the automated driving mode; and
    perform the notification using the image without outputting the voice message when the current driving mode is the user-involvement mode.

5. The vehicle control device according to claim 4, wherein
    the processor is further configured to:
    display an icon image indicating that the residual amount of energy has decreased on a display in response to the residual amount of energy being equal to or less than the first predetermined threshold during the automated driving mode, and
    continue displaying the icon image until a predetermined user operation to increase the residual amount of energy is detected or until a traveling power supply is turned off.

6. The vehicle control device according to claim 1, wherein
the notification during the automated driving mode is a proposal of switching the driving mode to the user-involvement mode.

7. A vehicle control device for a vehicle, the vehicle having a user-involvement mode and an automated driving mode as driving modes, the user-involvement mode being a driving mode in which a user sitting in a driver's seat is required to monitor a front of the vehicle, the automated driving mode being a driving mode in which the user is not required to monitor the front of the vehicle, the vehicle control device comprising a processor configured to:
acquire information of a current driving mode;
acquire a residual amount of energy that is a residual amount of power stored in a battery for driving or a residual amount of fuel for driving;
determine whether the current driving mode is the user-involvement mode or the automated driving mode;
determine whether the residual amount of energy becomes equal to or less than a first predetermined threshold when the current driving mode is determined to be the automated driving mode;
perform a notification related to a decrease in the residual amount of energy when the current driving mode is the automated driving mode and the residual amount of energy is determined to become equal to or less than the first predetermined threshold;
determine whether the residual amount of energy becomes equal to or less than a second predetermined threshold smaller than the first predetermined threshold when the current driving mode is determined to be the user-involvement mode;
perform the notification related to decrease in the residual amount of energy when the current driving mode is the user-involvement mode and the residual amount of energy is determined to become equal to or less than the second predetermined threshold; and
perform the notification earlier when the current driving mode is the automated driving mode than when the current driving mode is the user-involvement mode, wherein
the notification during the automated driving mode is a proposal of switching the driving mode to the user-involvement mode.

8. The vehicle control device according to claim 7, wherein
the processor is further configured to change the first predetermined threshold for the proposal depending on whether a traveling location of the vehicle is in a congested road section.

9. The vehicle control device according to claim 8, wherein
the processor is further configured to increase the first predetermined threshold to be larger by a predetermined amount when the traveling location of the vehicle is in the congested road section than when the traveling location of the vehicle is not in the congested road section.

10. The vehicle control device according to claim 1, wherein
the notification includes a proposal of stopping or turning down an air conditioner in response to the residual amount of energy being equal to or less than the first predetermined threshold during the automated driving mode.

11. A vehicle control device for a vehicle, the vehicle having a user-involvement mode and an automated driving mode as driving modes, the user-involvement mode being a driving mode in which a user sitting in a driver's seat is required to monitor a front of the vehicle, the automated driving mode being a driving mode in which the user is not required to monitor the front of the vehicle, the vehicle control device comprising a processor configured to:
acquire information of a current driving mode;
acquire a residual amount of energy that is a residual amount of power stored in a battery for driving or a residual amount of fuel for driving;
determine whether the current driving mode is the user-involvement mode or the automated driving mode;
determine whether the residual amount of energy becomes equal to or less than a first predetermined threshold when the current driving mode is determined to be the automated driving mode;
perform a notification related to a decrease in the residual amount of energy when the current driving mode is the automated driving mode and the residual amount of energy is determined to become equal to or less than the first predetermined threshold;
determine whether the residual amount of energy becomes equal to or less than a second predetermined threshold smaller than the first predetermined threshold when the current driving mode is determined to be the user-involvement mode;
perform the notification related to decrease in the residual amount of energy when the current driving mode is the user-involvement mode and the residual amount of energy is determined to become equal to or less than the second predetermined threshold; and
perform the notification earlier when the current driving mode is the automated driving mode than when the current driving mode is the user-involvement mode, wherein
the notification includes a proposal of stopping or turning down an air conditioner in response to the residual amount of energy being equal to or less than the first predetermined threshold during the automated driving mode.

12. The vehicle control device according to claim 1, wherein
the notification includes a proposal of lowering a set value of a traveling speed in response to the residual amount of energy being equal to or less than the first predetermined threshold during the automated driving mode.

13. A vehicle control device for a vehicle, the vehicle having a user-involvement mode and an automated driving mode as driving modes, the user-involvement mode being a driving mode in which a user sitting in a driver's seat is required to monitor a front of the vehicle, the automated driving mode being a driving mode in which the user is not required to monitor the front of the vehicle, the vehicle control device comprising a processor configured to:
acquire information of a current driving mode;
acquire a residual amount of energy that is a residual amount of power stored in a battery for driving or a residual amount of fuel for driving;
determine whether the current driving mode is the user-involvement mode or the automated driving mode;
determine whether the residual amount of energy becomes equal to or less than a first predetermined threshold when the current driving mode is determined to be the automated driving mode;

perform a notification related to a decrease in the residual amount of energy when the current driving mode is the automated driving mode and the residual amount of energy is determined to become equal to or less than the first predetermined threshold;

determine whether the residual amount of energy becomes equal to or less than a second predetermined threshold smaller than the first predetermined threshold when the current driving mode is determined to be the user-involvement mode;

perform the notification related to decrease in the residual amount of energy when the current driving mode is the user-involvement mode and the residual amount of energy is determined to become equal to or less than the second predetermined threshold; and perform the notification earlier when the current driving mode is the automated driving mode than when the current driving mode is the user-involvement mode, wherein the notification includes a proposal of lowering a set value of a traveling speed in response to the residual amount of energy being equal to or less than the first predetermined threshold during the automated driving mode.

14. The vehicle control device according to claim 1, wherein the notification includes a proposal of increasing a target value of an inter-vehicle distance in response to the residual amount of energy being equal to or less than the first predetermined threshold during the automated driving mode.

15. The vehicle control device according to claim 1, wherein the automated driving mode includes a normal mode and a control relaxed mode, the control relaxed mode being a mode in which a control parameter less strictly approaches to a target value than the normal mode, the notification includes a proposal of switching the driving mode from the normal mode to the control relaxed mode in response to the residual amount of energy being equal to or less than the first predetermined threshold during the automated driving mode.

16. The vehicle control device according to claim 1, wherein the processor is further configured to:
perform a notification including a proposal to switch to a power saving mode to increase a cruising range when the residual amount of energy is determined to become equal to or less than a third predetermined threshold smaller than the first predetermined threshold during the automated driving mode, and perform a notification including a proposal to terminate the automated driving mode when the residual amount of energy is determined to become equal to or less than a fourth predetermined threshold smaller than the third predetermined threshold during the automated driving mode.

17. The vehicle control device according to claim 1, wherein the processor is further configured to:
perform a notification including a proposal of turning off or turning down an air conditioner to increase a cruising range when the residual amount of energy is determined to become equal to or less than a third predetermined threshold smaller than the first predetermined threshold during the automated driving mode, and perform a notification including a proposal of lowering a set value of a traveling speed to further increase the cruising range when the residual amount of energy is determined to become equal to or less than a fourth predetermined threshold smaller than the third predetermined threshold during the automated driving mode.

* * * * *